US006011265A

United States Patent [19]

Sauli

[11] Patent Number: 6,011,265

[45] Date of Patent: Jan. 4, 2000

[54] RADIATION DETECTOR OF VERY HIGH PERFORMANCE

[75] Inventor: Fabio Sauli, Geneva, Switzerland

[73] Assignee: European Organization For Nuclear Research, Geneva, Switzerland

[21] Appl. No.: 08/956,128

[22] Filed: Oct. 22, 1997

[51] Int. Cl.[7] .............................. G01T 1/185; H01J 47/02

[52] U.S. Cl. ........................................ 250/374; 250/385.1

[58] Field of Search ................................. 250/374, 385.1

[56] References Cited

U.S. PATENT DOCUMENTS

| | | | |
|---|---|---|---|
| 3,676,682 | 7/1972 | Falk | 250/385.1 |
| 4,193,000 | 3/1980 | Shirayama et al. . | |
| 4,376,892 | 3/1983 | Charpak et al. . | |
| 5,194,738 | 3/1993 | Breskin et al. . | |
| 5,326,977 | 7/1994 | Oda | 250/390.01 |
| 5,434,468 | 7/1995 | Jeavons et al. . | |
| 5,602,397 | 2/1997 | Pitts et al. | 250/374 |
| 5,614,722 | 3/1997 | Solberg et al. . | |

FOREIGN PATENT DOCUMENTS

| | | |
|---|---|---|
| 3-159050 | 7/1991 | Japan . |

OTHER PUBLICATIONS

European Laboratory For Particle Physics, Title: The Gas Electron Multiplier (GEM), Author: Bouclier, et al., CERN–PPE/96–177, Nov. 4, 1996.

European Laboratory for Particle Physics, Title: Progress With The Gas Electron Multiplier, Author: Buttner, et al., CERN–PPE/97–73, Jul. 2, 1997.

European Laboratory For Particle Physics, Title: New Observations With The Gas Electron Multiplier (GEM), Author: Bouclier, et al., CERN–PPE/97–32, Mar. 4, 1997.

J. Phys. III France 6 (1996) pp. 337–347, Mar. 1996, Title: The C.A.T. Pixel Proportional Gas Counter Detector, Author: Bartol, F., et al.

Nuclear Instruments and Methods 217 (1983) pp. 237–243, North Holland Publishing, Part VII. Particle Identification, Title: Identification With a Large–Aperture Ring–Imaging Cherenkov Counter, Author: Adams, M., et al.

Service D'Etude Des Detecteurs, DAPNIA/SED 95–04, Dec. 1995, Title: Micromegas: A High–Granularity Position–Sensitive Gaseous Detector For High Particle–Flux Environments, Author: Giomataris, Y., et al.

Nuclear Instruments & Methods in Physics Research Section A, 1996, 531–534, Title: A New Concept for Electron Amplification in Gas Detectors, Author: F. Sauli.

Physics Letters, vol. 78B, No. 4, Oct. 9, 1987, Title: The Multistep Avalanche Chamber: A New High–Rate, High–Accuracy Gaseous Detector, Author: Charpak, G. and F. Sauli, pp. 523–528.

*Primary Examiner*—Constantine Hannaher
*Assistant Examiner*—Andrew Israel
*Attorney, Agent, or Firm*—Larson & Taylor

[57] ABSTRACT

A radiation detector in which primary electrons are released into a gas by ionizing radiations and drifted through an electric field to a collecting electrode for detection. It further includes a gas electron multiplier formed by one or several matrices of electric field condensing areas which are distributed within a solid surface perpendicular to the electric field. Each electric field condensing area consists of a tiny hole passing through the solid surface that forms a dipole adapted to produce a local electric field amplitude enhancement proper to generate an electron avalanche from one primary electron. The gas electron multiplier operates thus as an amplifier or a preamplifier within a host radiation detector.

26 Claims, 14 Drawing Sheets

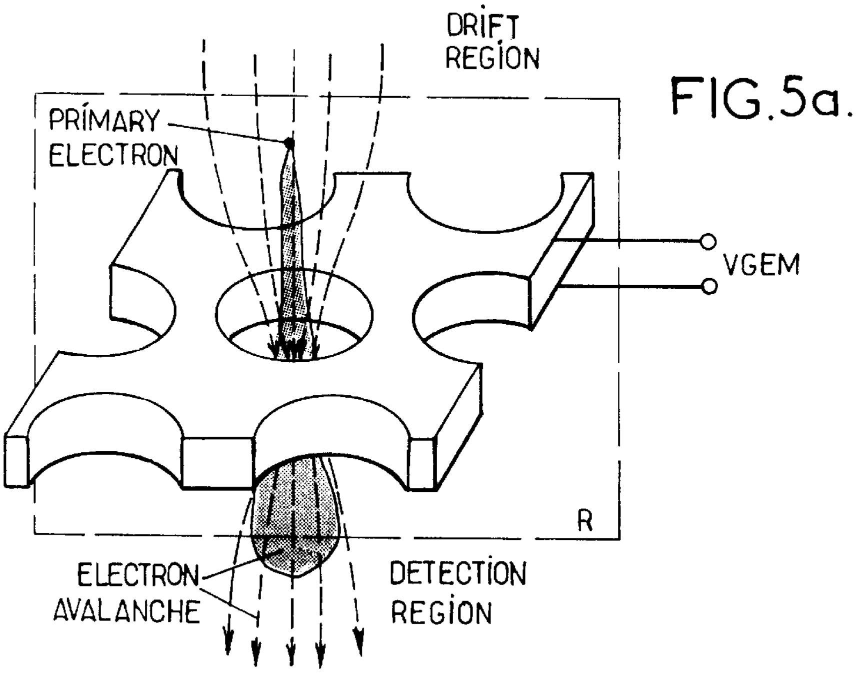
FIG.5a.
FIG.5b.
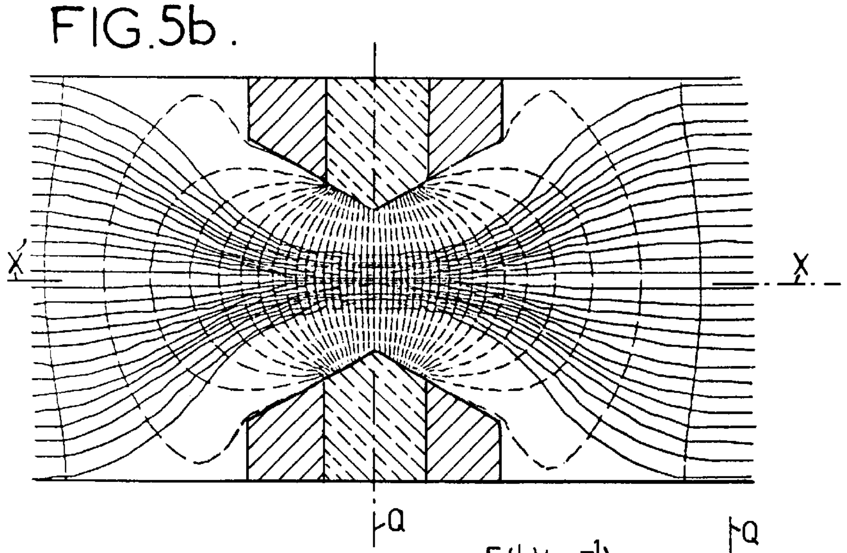
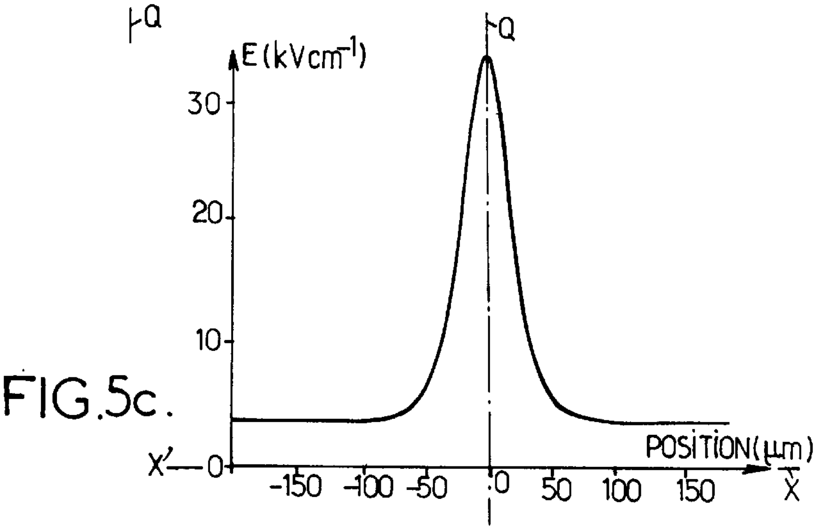
FIG.5c.

FIG.9b.
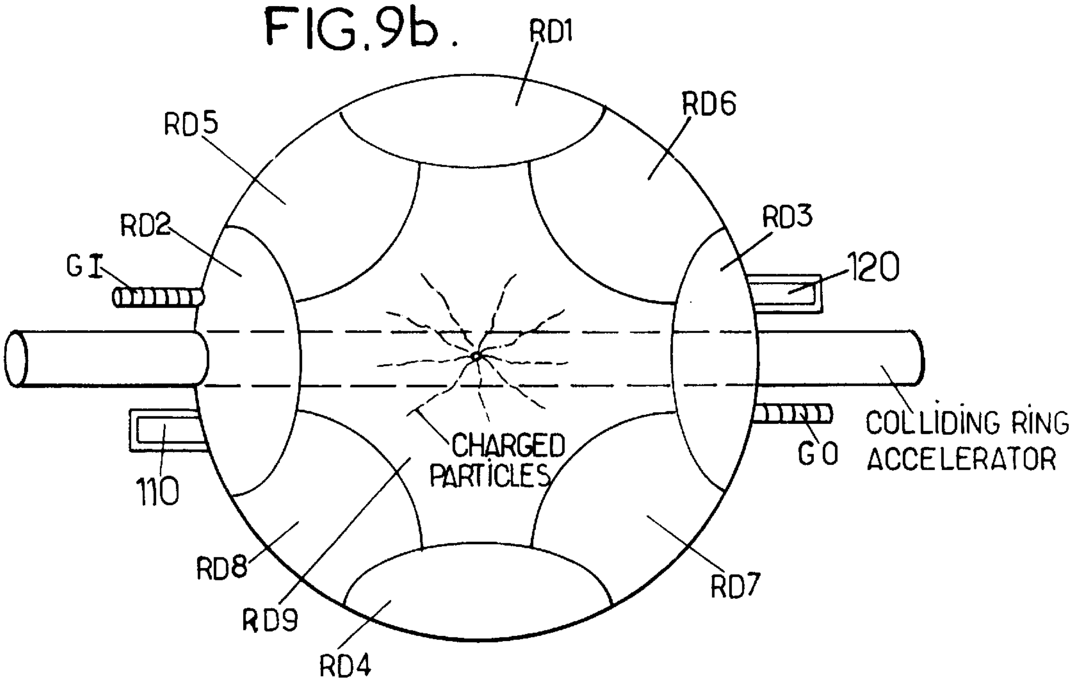
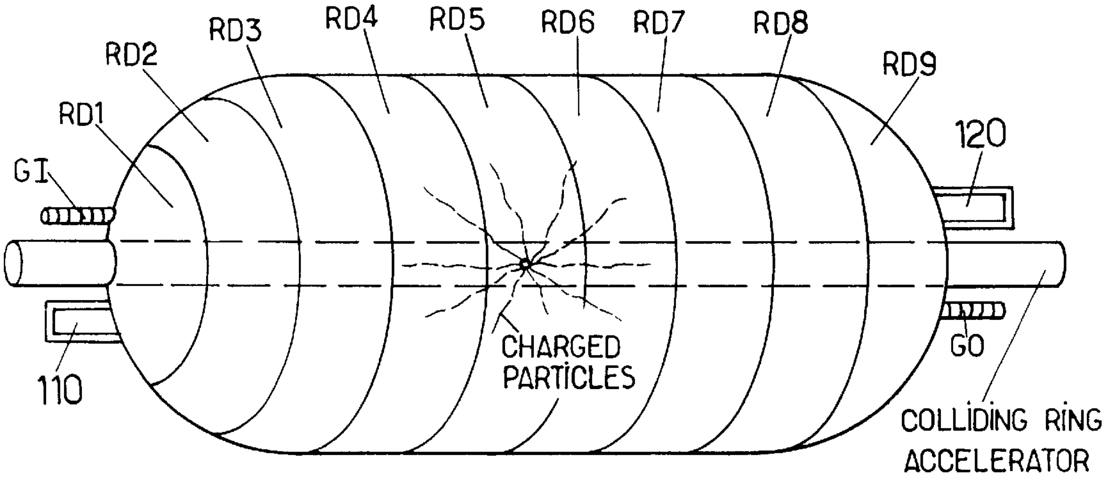
FIG.9c.

RADIATION DETECTOR OF VERY HIGH PERFORMANCE

BACKGROUND OF THE INVENTION

1. Field of the Invention

The present invention relates to an improved technique for embodying a radiation detector of very high performance that can be used for detecting in position ionizing radiations such as charged particles, photons, X-rays and neutrons.

2. Brief Description of the Prior Art

Radiation detectors exploiting the process of ionization and charge multiplication in gases have been in use with continued improvements since hundred years. Methods for obtaining large "stable" proportional gains in gaseous detectors are a continuing subject of investigation in the detectors community.

Several years ago, G. CHARPAK and F. SAULI introduced the multistep chamber, thereafter designated as MSC, as a way to overcome on limitations of gain in parallel plate and multiwire proportional chambers, thereafter designated as MWPC.

In MSC chambers, two parallel grid electrodes mounted in the drift region of a conventional gas detector and operated as parallel plate multipliers allow to preamplify drifting electrons and transfer them into the main detection element. Operated with a photosensitive gas mixture, the MSC chamber allows to reach gains large enough for single photodetection in ring-imaging CHERENKOV detectors, thereafter designated as RICH. For more details with respect to MSC chambers and RICH chambers, we refer to the following publications:

G. CHARPAK and F. SAULI, Physics Letters, vol.78B, 1978, p.523, and

M. ADAMS and al., Nuclear Instrumentation Methods, 217, 1983, 237.

More recently, G. CHARPAK and Y. GIOMATARIS have developed an improved radiation detector device thereafter designated as MICROMEGAS which is a high gain gas detector using as multiplying element a narrow gap parallel plate avalanche chamber.

In a general point of view, such a detector consists of a gap in the range 50 to 100 $\mu$m which is realized by stretching a thin metal micromesh electrode parallel to a read-out plane. G. CHARPAK and Y. GIOMATARIS have demonstrated very high gain and rate capabilities which are understood to result from the special properties of electrode avalanches in very high electric fields. For more details concerning the MICROMEGAS detector, we refer to the publication edited by Y. GIOMATARIS, P. REBOUGEARD, J. P. ROBERT and G. CHARPAK in Nuclear Instruments Methods, A376, 1996, 29.

The major point of inconvenience of both described detectors lies in the necessity of stretching and maintaining parallel meshes with very good accuracy. The presence of strong electrostatic attraction forces adds to the problem particularly for large size of the detectors. To overcome this drawback, heavy support frames are required and in the case of the MICROMEGAS detector the introduction in the gap of closely spaced insulating lines or pins with the ensuing complication of assembly and loss of efficiency is necessary.

Another radiation detector device was recently developed and proposed by F. BARTOL and al. Journal of Physics III 6 (1996), 337.

This detector device, thereafter designated as CAT, for Compteur à trous, substantially consists of a matrix of holes which are drilled through a cathode foil. The insertion of an insulating sheet between cathode and buried anodes allows thus to guaranty a good gap uniformity and to obtain high gains.

OBJECTS OF THE INVENTION

An object of the present invention is therefore to provide a radiation detector of very high performance that overcomes the above-mentioned drawbacks of the radiation detectors of the prior art.

Another object of the present invention is furthermore to provide a radiation detector of very high performance that appears to hold both the simplicity of the MSC chamber and the high field advantages of the MICROMEGAS and CAT radiation detectors however mechanically much simpler to implement and more versatile in use.

Another object of the present invention is therefore to provide a radiation detector of very high performance in which a very high degree of accuracy and resolution is obtained thanks to an electric charges transfer coefficient which substantially equals unity.

Another object of the present invention is therefore to provide a radiation detector with substantially constant amplifying factor for counting rates up to $10^5$ Hz/mm$^2$.

SUMMARY OF THE INVENTION

More particularly, in accordance with the present invention, there is provided a radiation detector in which primary electrons are released into a gas by ionizing radiations and drift to a collecting electrode by means of an electric field. The radiation detector of the invention includes a gas electron multiplier comprising at least one matrix of electric field condensing areas with these electric field condensing areas being distributed within a solid surface which is substantially perpendicular to the electric field. Each of the electric field condensing areas is adapted to produce a local electric field amplitude enhancement proper to generate in the gas an electron avalanche from each one of the primary electrons. The gas electron multiplier operates thus as an amplifier of given gain for the primary electrons.

The objects, advantages and other particular features of the present invention will become more apparent upon reading of the following non-restrictive description of preferred embodiments thereof which are given by way of example only with reference to the accompanying drawings.

BRIEF DESCRIPTION OF THE DRAWINGS

In the appended drawings:

FIG. 5*a* is a perspective view of a detail of FIG. 4*b* in which the mode of operation of the gas electron multiplier in a radiation detector in accordance with the invention operates to generate an electron avalanche from a primary electron;

FIG. 5*b* is a cross-section view along a section plane designating as plane R represented in phantom line at FIG. 5*a*, in which the electric field lines and electric potential lines are represented at the level of a local electric field condensing area with the potential lines being represented in solid lines and the electric field line being represented in phantom lines;

FIG. 5*c* is a diagram representing the electric field distribution within the local condensing area shown at FIG. 5*b*, the electric field being plotted with reference to a symmetry axis X'X shown at FIG. 5*b;*

FIGS. 9*b* and 9*c* are front views representing a preferred embodiment of a radiation detector in accordance with the present invention which is more particularly adapted for the detection of ionizing radiations which are generated by colliding particles accelerated within the colliding ring path of an accelerator of the synchrotron-type, this accelerated particles having thus very high energy levels;

DETAILED DESCRIPTION OF THE PREFERRED EMBODIMENTS

The radiation detector according to the invention is now disclosed as a non-limitative example in the present specification. Particularly, it should be kept in mind that the radiation detector in accordance with the invention can be used with the same advantages in many types of applications such as radiography, imaging medicine, and in a more general sense any kind of radiation which comes to effect to release primary electrons in a gas.

Figure 1B:
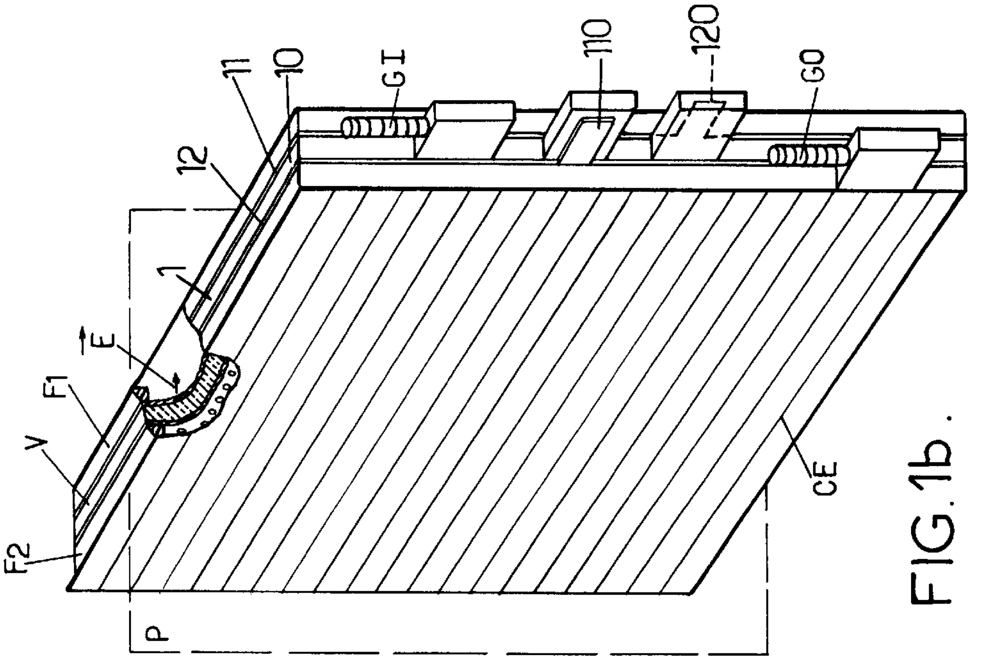
FIG. 1*b* is a perspective view of a particular embodiment of a radiation detector in accordance with the present invention which is planar in shape.
Figure 1A:
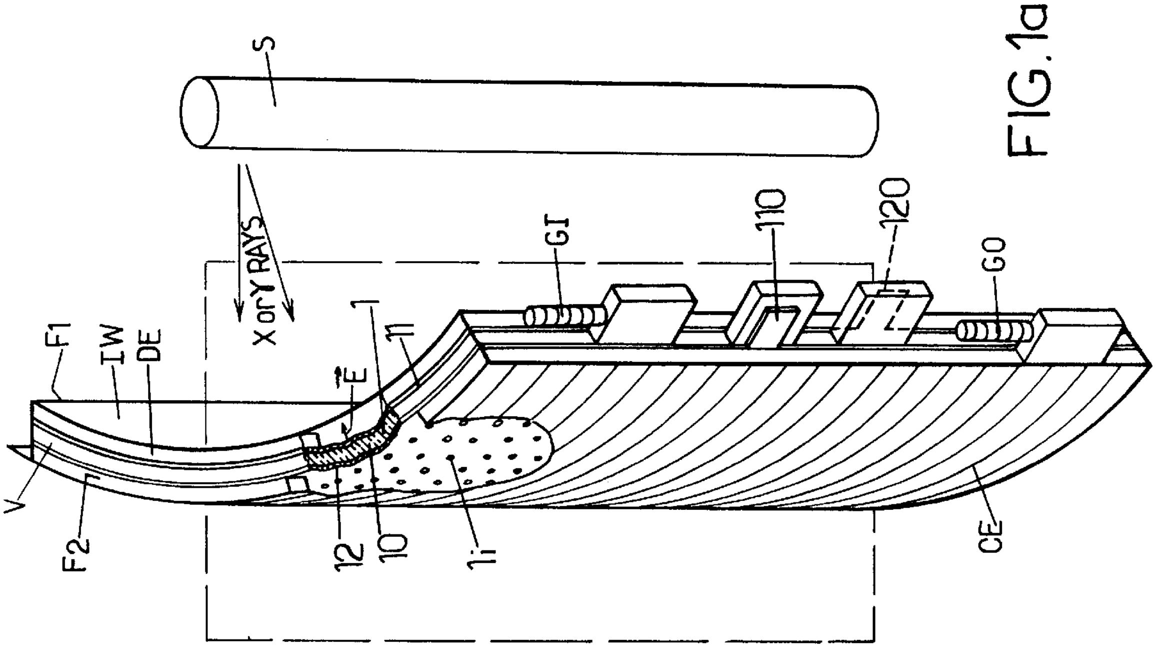
FIG. 1*a* is a perspective view of a preferred embodiment of a radiation detector in accordance with the present invention which is cylindrical in shape.
Figure 1C:
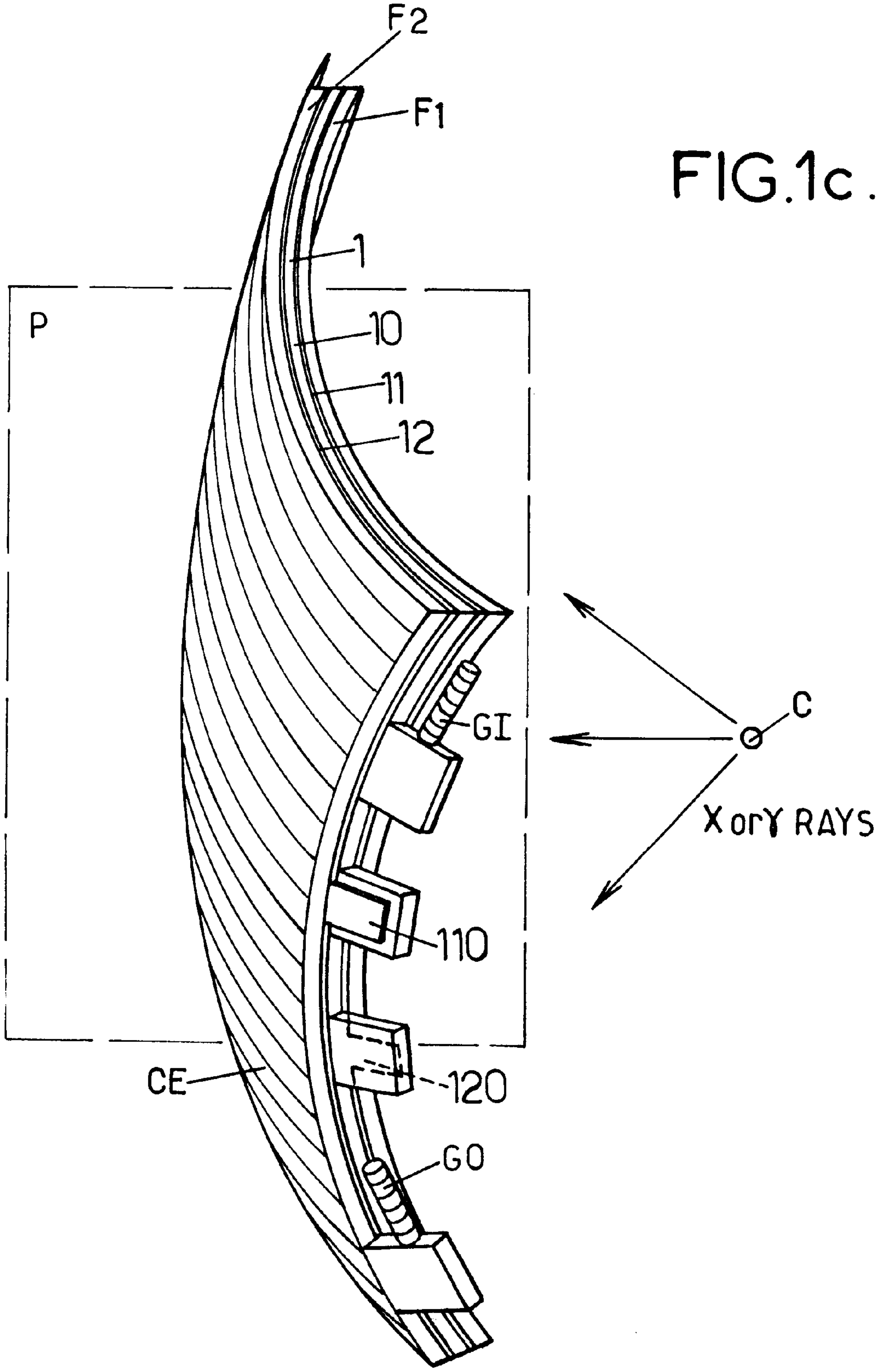
FIG. 1*c* is a perspective view of a particular embodiment of a radiation detector in accordance with the present invention which is spherical in shape.

The radiation detector in accordance with the invention is thus disclosed with reference to FIGS. 1*a*, 1*b* and 1*c*.

In the accompanying drawings, the same references designate the same elements while relative dimensions of these elements are not represented for the sake of better comprehension of the whole.

As shown at FIG. 1*a*, the radiation detector in accordance to the invention is a detector of the type in which primary electrons are released into a gas by ionizing radiations with these primary electrons being drifted to a collecting electrode by means of an electric field. In the above-mentioned figures, vector $\vec{E}$ designates the electric field, CE designates the collecting electrode.

Generally, the radiation detector of the invention may comprise a vessel referred to as V containing the gas in which the primary electrons are released by an incident ionizing radiation. In FIGS. 1*a*, 1*b* and 1*c*, the ionizing radiation is designated as X-rays or gamma-rays which are generated from a source referred to as S. The X-rays or gamma-rays generated by the source S enter thus the radiation detector of the invention through an inlet window referred to as IW and generate primary electrons which are released into the gas contained within the vessel V. The inlet window IW has a metal clad inner surface generally consisting of a thin metal film which, in operation, is put at a drift potential thereafter designated as VD. As shown at FIG. 1*a* for example, the collecting electrode CE, and the inlet window IW and drift electrode DE may well form the vessel V so as to contain the gas in which the primary electrons are thus released on inpingement of the ionizing radiation. Light frames referred to as $F_1$, $F_2$ may be used to build up the vessel V.

As further shown at FIGS. 1*a*, 1*b* or 1*c*, the vessel V is further provided with a gas inlet thereafter designated as GI, and a gas outlet designated as GO, both consisting of a threaded tiny tube allowing the filling of the vessel V with a particular gas mixture or dedicated gas as it will be disclosed in more details later in the description. Gas inlet GI and gas outlet GO may well be located onto opposite sides of the vessel V so as to insure proper gas filling and circulation.

As clearly shown at FIGS. 1*a*, 1*b* and 1*c*, the radiation detector in accordance with the invention further includes a gas electron multiplier, thereafter designated as GEM and bearing reference sign 1, this gas electron multiplier 1 comprising at least one matrix of electric field condensing areas with these electric field condensing areas being each designated as $\mathbf{1}_i$.

In the above-mentioned figures, the electric field condensing areas are distributed within a solid surface which is substantially perpendicular to the electric field vector $\vec{E}$. Each of the electric field condensing areas $\mathbf{1}_i$ is adapted to produce a local electric field amplitude enhancement which is proper to generate in the gas an electron avalanche from each one of the primary electrons. The gas electron multiplier 1 operates thus as an amplifier of given gain for these primary electrons while the collecting electrode CE allows a detection of the electron avalanche to be performed, as it is disclosed later in the specification. As shown at FIGS. 1*a*, 1*b* and 1*c*, the solid surface forming the matrix of electric field condensing areas may well have different shapes with the shape of the vessel V containing the gas being adapted accordingly as shown in the above-mentioned figures. Thus, at FIG. 1*a*, the solid surface embodying the gas electron multiplier is cylindrical in shape with both the inlet window IW and associated drift electrode DE together with collecting electrode CE being of same cylindrical shape so as to develop a radial electric field vector $\vec{E}$ which is substantially perpendicular to this cylindrical solid surface forming the gas electron multiplier 1.

At FIGS, 1*b*, to the contrary to FIG. 1*a*, the gas electron multiplier is formed by a solid surface which is planar in shape with the inlet window IW and its associated drift electrode DE together with collecting electrode CE being parallel to one another so as to form a planar structure. As a consequence, the electric field vector, vector $\vec{E}$ which is developed between collecting electrode CE and inlet window and drift electrode DE, is substantially perpendicular to the planar solid surface embodying the gas electron multiplier 1.

At FIG. 1*c*, the solid surface embodying the gas electron multiplier 1 is spherical in shape with this solid surface being delimited by planar intersections of this solid surface. In the same way as to FIGS. 1*a* and 1*b*, collecting electrode CE and inlet window IW and its associated drift electrode DE are spherical in shape so as to develop an electric field vector $\vec{E}$ which is substantially perpendicular to corresponding spherical solid surface embodying the gas electron multiplier 1.

As shown at FIGS. 1*a*, 1*b* and 1*c*, each electric field condensing area $\mathbf{1}_i$ is represented for better comprehension as to consist of a hole in which the local electric field amplitude enhancement generated thereto is substantially symmetrical in relation to an axis of symmetry of this condensing local area. This local electric field amplitude enhancement is thus substantially at a maximum at the center of symmetry of each condensing local area $\mathbf{1}_i$. In accordance with one particular aspect of the radiation detector of the invention, the electric field condensing areas $\mathbf{1}_i$ are substantially identical in shape and regularly distributed within the solid surface whichever its shape as shown at FIGS. 1*a* to 1*c* so as to form the gas electron multiplier 1.

More details relative to the structure and the mode of operation of the gas electron multiplier 1 embodying the radiation detector of the invention will be given now with reference to FIGS. 2*a*, 2*b* and 3*a*, 3*b*.

Figure 2A:
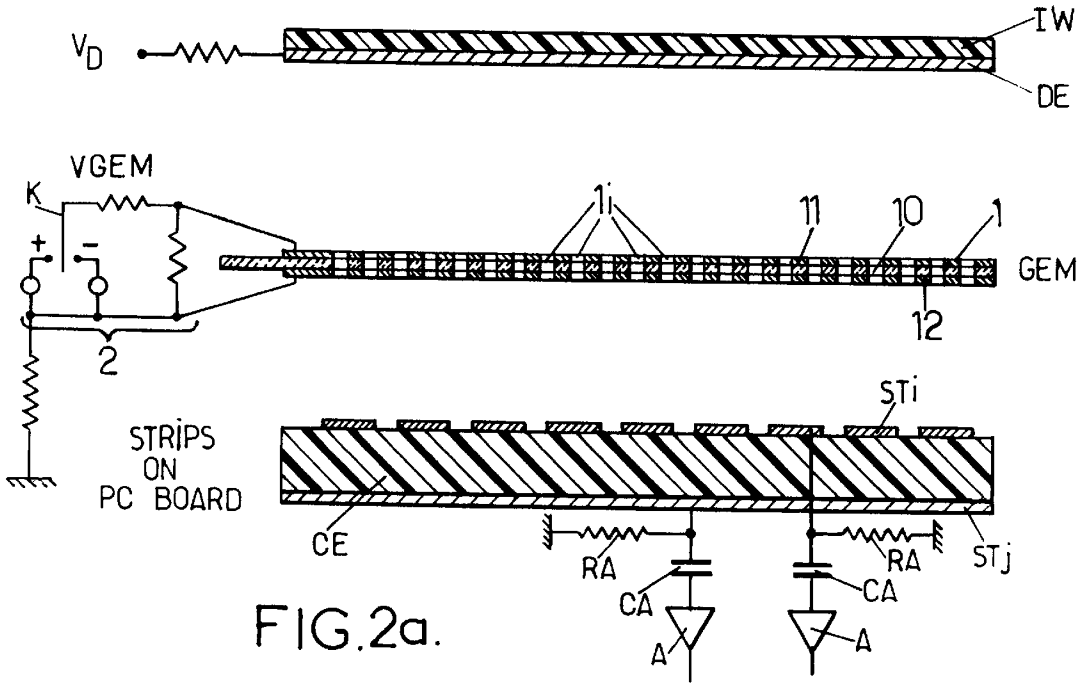
FIG. 2*a* is a cross-section view along a section plane designated as plane P which is represented in phantom line for FIGS. 1*a* and 1*b;*
Figure 2B:
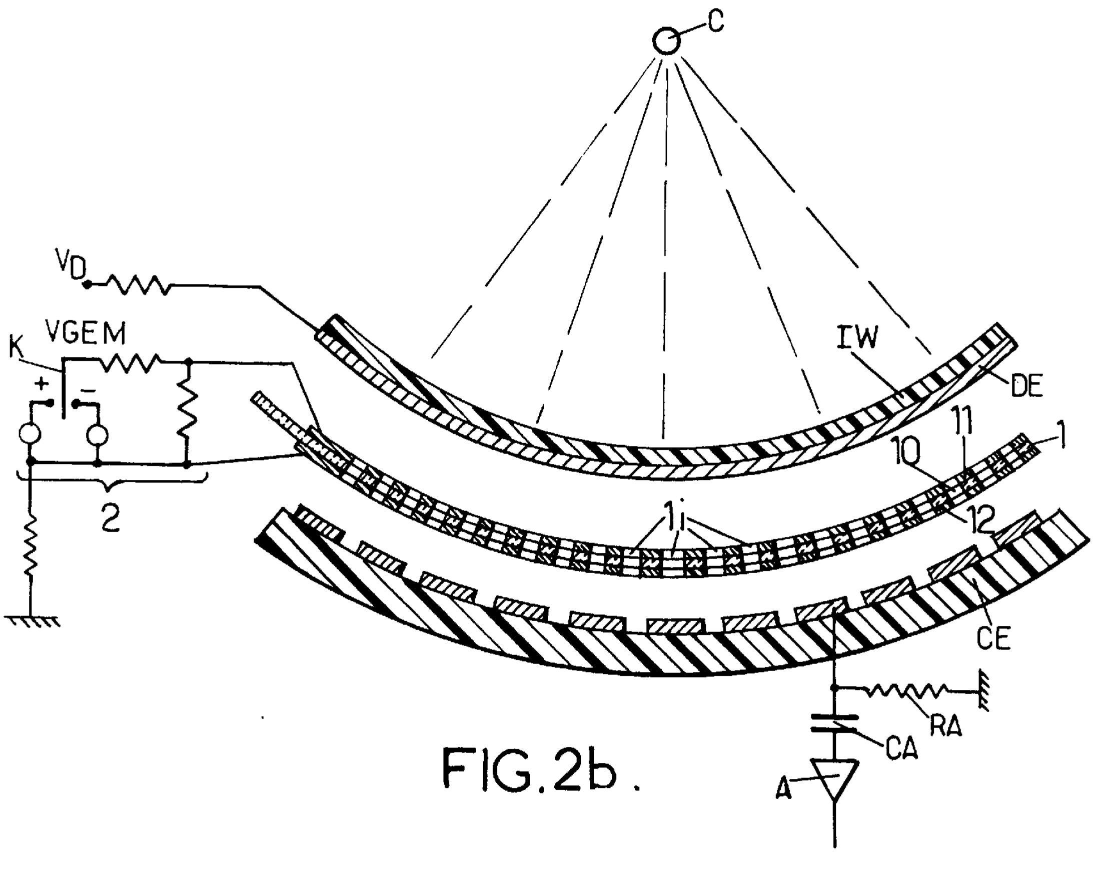
FIG. 2*b* is a cross-section view along a section plane designated as plane P which is represented in phantom line at FIG. 1*c;*

FIG. 2*a* represents a cross-section view of the radiation detector in accordance with the invention as shown at FIG. 1*a* or FIG. 1*b* with this cross-section view being taken along intersecting plane P which is shown in phantom line at FIGS. 1*a* and 1*b* while FIG. 2*b* is a cross-section view along corresponding intersecting plane P shown in phantom line at FIG. 1*c*.

FIGS. 2*a* and 2*b* differ only in the extent that the same elements of FIG. 2*b* are bent owing to the spherical shape of the solid surface embodying the gas electron multiplier 1 and the collecting electrode CE, the inlet window IW and its associated drift electrode DE. In any case, collecting electrode CE is deemed to consist as an example of metal pads or strips which are laid onto a printed circuit board so as to allow detection of the electrode avalanches as previously mentioned in the specification.

As shown at FIGS. 2*a* and 2*b* in a preferred embodiment of the gas electron mutiplier forming the radiation detector of the invention, the matrix of electric field condensing areas $\mathbf{1}_i$ may comprise a foil metal clad insulator, referred to as 10, on each of its faces so as to form a first and second metal-cladding, referred to as 11 and 12 respectively, with these metal-cladding sandwiching the insulator foil 10 to form a regular sandwich structure. The matrix of electric field condensing areas further comprises a plurality of bored-through holes, or through holes referred to as $\mathbf{1}_i$, traversing the regular sandwich structure as shown at FIGS. 2*a* and 2*b* so as to form these electric field condensing areas.

In addition, biasing means are adapted to develop a bias voltage potential which is applied to the first and second metal cladding 11, 12, so as to generate at the level of each of the bored-through holes one electric field condensing area $\mathbf{1}_i$. At FIGS. 2*a* and 2*b*, the biasing means are indicted at 2 and adaptated to develop a difference potential denoted VGEM.

Figure 3A:
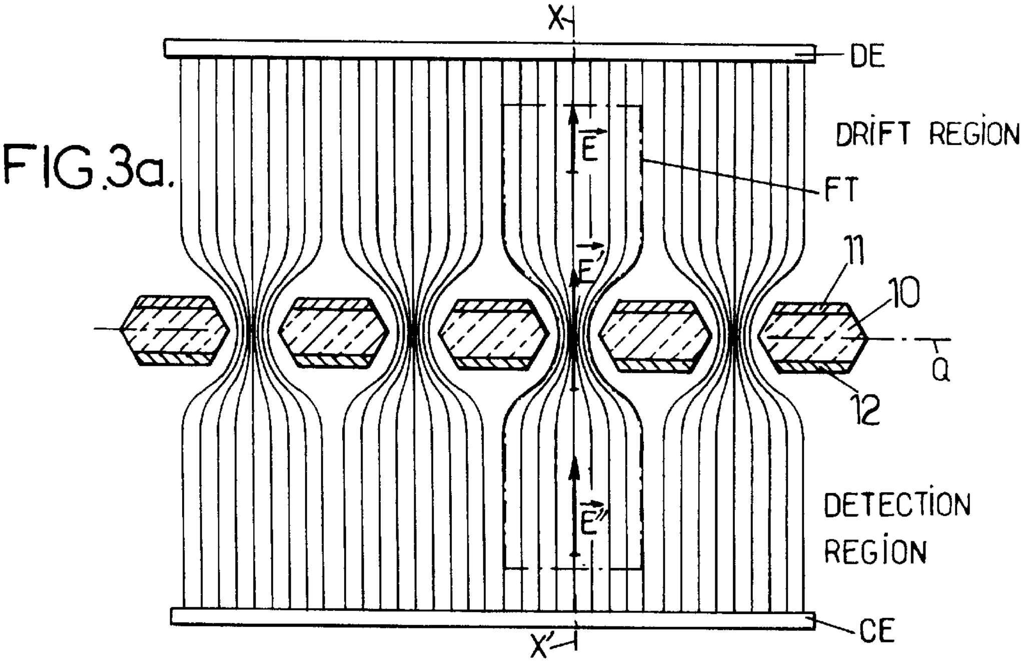
FIG. 3*a* is a diagram representing the electric field lines for FIG. 2*a;*
Figure 3B:
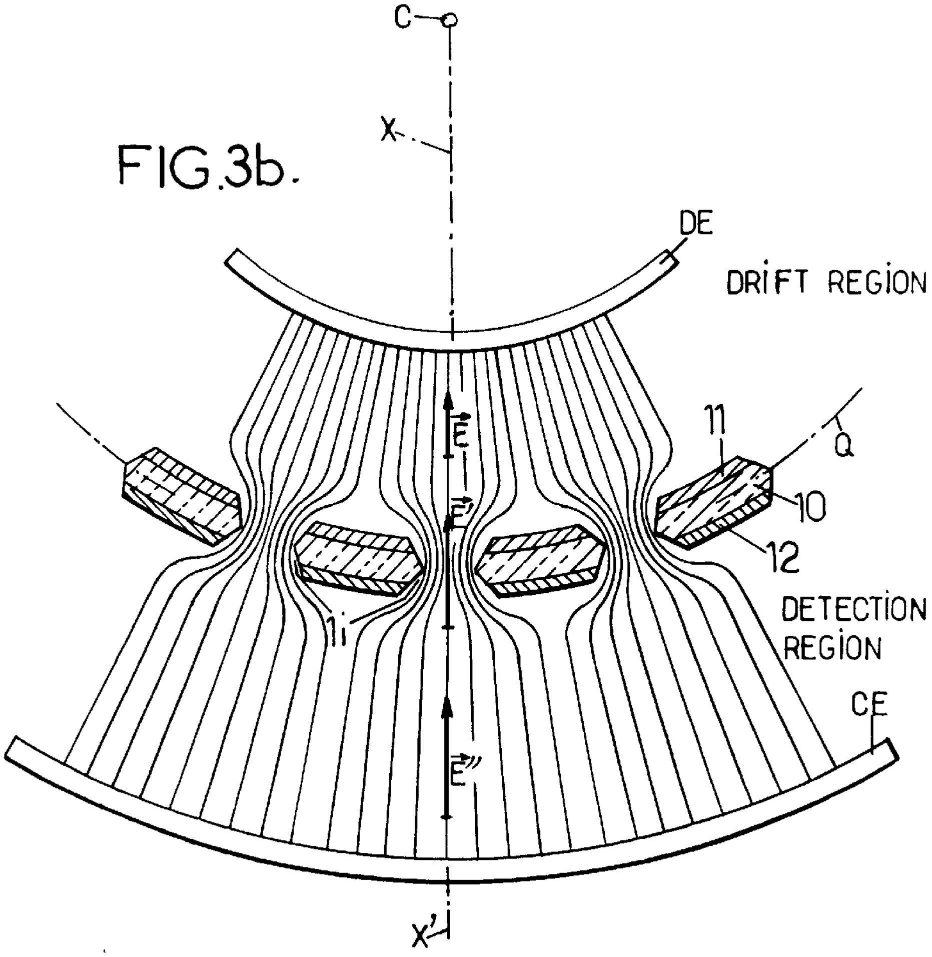
FIG. 3*b* is a diagram representing the electric field lines for FIG. 2*b;*

The mode of operation of the radiation detector in accordance with the invention and more particularly the mode of operation of the gas multiplier 1 which is shown at FIGS. 2*a* and 2*b* is now disclosed with reference to FIG. 3*a* and FIG. 3*b*.

Generally speaking, with the regular sandwich structure being put in operation substantially perpendicular to the electric field vector $\vec{E}$, the first metal-cladding 11 forms thus an input face for the drift electrons while the second metal-cladding 12 forms an output face for any electron avalanche which is generated at the level of each bored-through hole forming one of the electric field condensing areas $\mathbf{1}_i$.

With reference to FIG. 3*a*, the electric field lines bearing the electric field vector $\vec{E}$ are represented between drift electrode DE and the gas electron multiplier 1, respectively the latter and collecting electrode CE while the electric field lines bearing the electric field vector $\vec{E}''$ are represented between the gas electron multiplier 1 and the collecting electrode CE. With the first 11 and second 12 metal-cladding being put at a convenient voltage potential, i.e. a continuous voltage potential difference value, each of the local electric field condensing area $\mathbf{1}_i$, i.e. each bored-through hole, behaves as a dipole which in fact superimposes a further electric field vector $\vec{E}$ with this further electric field being substantially directed along a symmetry axis of each bored-through hole. It should be borne in mind that the electric field lines are thus distorted as shown at FIG. 3*a* or 3*b* at the level of each of the local electric field condensing areas $1_i$.

For the sake of clarity and better comprehension, FIGS. 3*a* and 3*b* are shown in the absence of electric charges within the drift region and the detection region that in such a case fully corresponds to the absence of ionizing radiations. For instance, any virtual solid surface thereafter designated as FT which is delimited by the outermost electric field lines reaching one given local electric field condensing area, as shown at FIG. 3*a* for example, delineates an electric field tube FT in which the electric field flux presents a preservative character. As a consequence, it is clear to any person of ordinary skill in the corresponding art that the enhancement of the electric field at the level of each local electric field condensing area $1_i$ is thus given accordingly with any surface being passed through by the condensed electric field vector $\vec{E}'$ being in direct relation to the enhancement of the resulting electric field which is thus equal to the sum of original electric field vector $\vec{E}$ and superimposed electric field vector $\vec{E}'$.

Owing to the symmetrical character of the sandwich structure with respect to the symmetry plane referred to as plane Q at FIG. 3*a*, any virtual solid surface formed by the outermost electric field lines reaching a corresponding local electric field condensing area $1_i$ is substantially transferred as a symmetrical virtual solid surface formed by the electric field line leaving the same local electric field condensing area in the detection region, as shown at FIG. 3*a* with respect to the same electric field tube FT. As a consequence, provided given relations between voltage difference potential which is applied to the first 11 and the second 12 metal-cladding sandwiching the insulator foil 10 which will be explained later in the specification are fulfilled, it is thus clear that the distorted solid surface of electric field lines of the drift region is fully restored within the detection region as shown at FIG. 3*a*. It is furthermore emphasized that while the electric field $\vec{E}$ within the drift region and the electric field $\vec{E}''$ within the detection region are substantially parallel, they may well have amplitude of different value. As an example, the detection region electric field amplitude $|\vec{E}''|$ may be set up at a larger value than the drift region electric field amplitude $|\vec{E}|$ so as to increase the transfer velocity to the collecting electrode to get thus faster signals. The same situation occurs at FIG. 3*b* with the general form of the electric field lines being modified only by the spherical shape of the sandwich structure and more particularly its circular shape as represented at FIG. 3*b*.

Figure 4A:
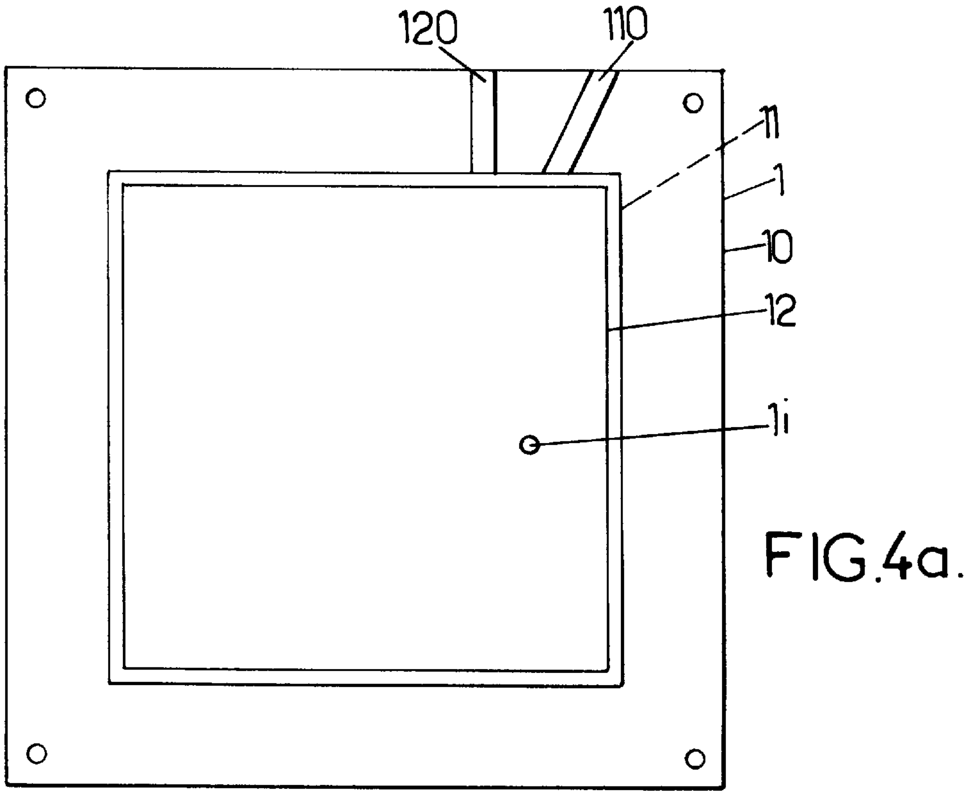
FIG. 4*a* is a front view representing a detail of FIG. 1*b*, such a detail consisting of a gas electron multiplier comprising one matrix of electric field condensing areas.
Figure 4B:
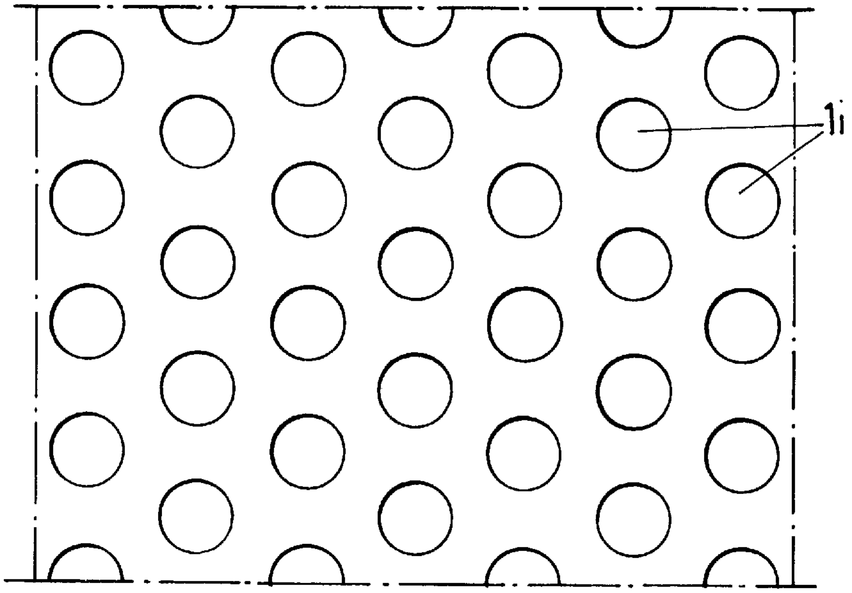
FIG. 4*b* is a front view of a detail of FIG. 4*a* in which the matrix of electric field condensing areas is shown in a non-limitative way to consist of circular bored-through holes.

A preferred embodiment of the gas electron mutiplier embodying a radiation detector in accordance with the present invention is now disclosed with reference to FIGS. 4*a*, 4*b* and more generally FIGS. 4*c* to 4*f*. As shown for example at FIG. 4*a*, the gas electron multiplier 1 may consist of a thin insulator foil referred to as 10 which is metal clad on each of its faces, the metal cladding being thus referred to as 11 and 12 with reference to FIGS. 2*a* and 2*b*, the sandwich structure thus formed being further traversed by a regular matrix of tiny holes referred to as $1_i$. Typical values are 25 to 500 μm of thickness for the foil with the centre of the tiny holes being separated at a distance comprised between 50 and 300 μm. The tiny holes may well have a diameter which is comprised between 20 and 100 μm. The matrix of tiny holes $1_i$ is generally formed in the central area of an insulator foil of regular shape as shown at FIG. 4*a*. The insulator foil 10 is thus provided with electrodes on each of its faces which are referred to as 120 and 110, these electrodes being thus adapted so as to apply a potential difference between the two metal sides of the mesh embodying the matrix of tiny holes. The composite mesh can thus be manufactured with conventional technologies which will be described later in the description, is simple to install rugged and resistant to accidental discharges.

The mesh as shown at FIG. 4*a* can be realized by conventional printed circuit technology. As an example, two identical films or masks are imprinted with the desired pattern of holes and overlaid on each side of the metal clad insulator foil 10 which is previously coated with a light sensitive resin. The insulator foil 10 may consist of a polymer such as KAPTON or the like, KAPTON being a registered trade-mark to DUPONT DE NEMOURS. Exposure to ultraviolet light and development of the resin exposes thus the metal to acid etching only in the regions to be removed, i.e. the tiny holes. The foils are then immersed into an adequate solvent for the polymer used and holes dig within the foils from the two sides by chemical etching. The whole processing uses common and well-known industrial procedures as though a precise control of the etching parameter are essential to obtain a reproducible mesh. The above-mentioned method is proper to allow the manufacturing of mesh from an insulator foil of thickness comprised between 20 to 100 μm for example. For insulator foils of greater thickness, i.e. of a thickness comprised between about 100 to 500 μm, alternative standard methods of manufacturing like plasma etching or laser drilling can also be used and provide similar results. One method of particular interest appears to be laser drilling since the process of drilling holes can be computed and controlled accordingly so as to obtain matrices of tiny holes of adapted shape with respect to corresponding application.

A detail of the mesh thus obtained is represented at FIG. 4*b*. Although the tiny holes shown at FIG. 4*b* are circular in shape, they may well be of different shape as it will be thus disclosed with reference to FIGS. 4*c*, 4*d* and 4*e*.

Figure 4C:
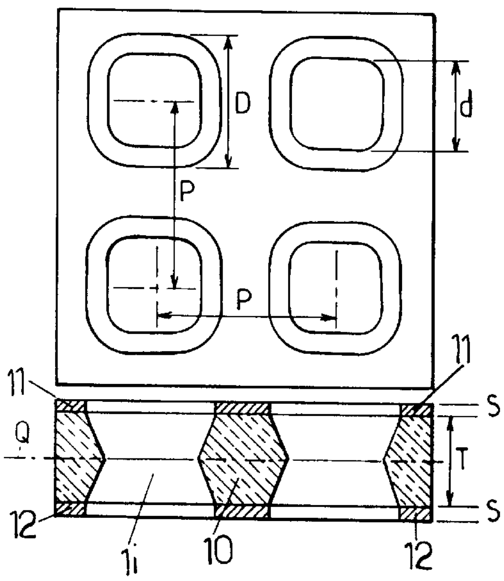
FIGS. 4*c*, 4*d*, 4*e* and 4*f* show particular embodiments of matrices provided with bored-through holes of different shapes and pitch.
Figure 4D:
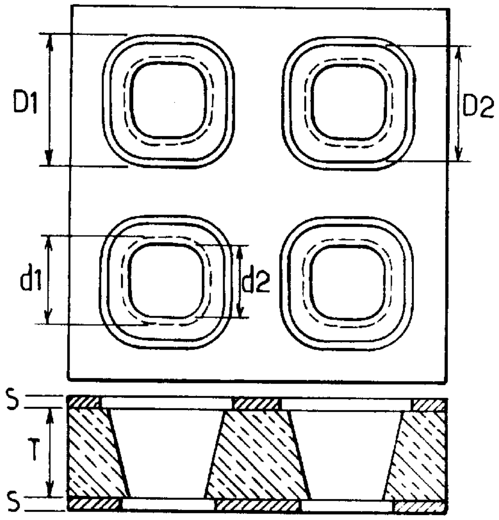

These figures consist of a front view of the mesh together with a cross-section view of this front view along a plane containing the center of symmetry of two successive tiny holes forming the matrix of tiny holes in the corresponding front view. With reference to FIGS. 4*b*, 4*c*, 4*d* and 4*e*, each tiny hole is deemed to be included within an opening aperture diameter which is comprised between 20 and 100 μm. While the tiny holes as shown at FIG. 4*b* are circular in shape with the outermost dimension of the holes fully corresponding to its aperture diameter, to the contrary, the tiny holes which are shown at FIGS. 4*c* and 4*d* fully correspond to square holes with rounded angles with the rounded angles corresponding to the opening aperture diameter of the hole.

The rounded angles allow to reduce the erratic electric discharges phenomenon.

Figure 4E:
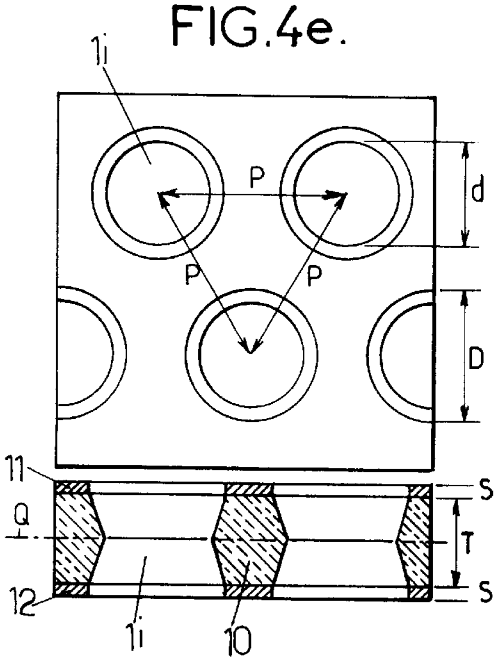

At FIG. 4*e*, the tiny holes are represented so as to fully correspond to the tiny holes which are shown at FIG. 4*b*. In FIGS. 4*c*, 4*d* and 4*e*, parameters P, D, d, T and S designate:

P the distance separating two successive tiny holes centers;

D the outermost dimension of any square tiny hole;

d the innermost dimension of any square tiny hole;

T the thickness of the insulator foil 10,

S the thickness of the first 11 and second 12 metal cladding embodying the sandwich structure.

Corresponding values of the above-mentioned parameters P, D, d, T and S are thus given for FIGS. 4*c* and 4*d* with these dimensions being expressed in micrometers.

As shown as an example at FIGS. 4*c* and 4*d*, each bored-through hole $1_i$ consists of a bored-through hole which is formed by a first and a second frusto-conical bored hole. The first frusto-conical bored hole extends from the first metal-cladding 11 to an intermediate surface of the regular sandwich structure which is referred to as plane Q at FIGS. 3*a*, 3*b* and 4*c*, 4*e*. The second frusto-conical bored hole extends from the second metal-cladding 12 to the same intermediate surface referred to as plane Q, both frusto-conical bored-holes having a first circular opening of a diameter of a given value as previously mentioned in the description at the level of the corresponding metal-cladding 11 or 12. Both of the frusto-conical bored holes join together at the level of the intermediate surface Q of the regular sandwich structure forming thus the corresponding bored-through hole $1_i$ as shown at FIGS. 4*c* and 4*e*. With the same pitch P of given value as previously mentioned in the description, the bored-through holes $1_i$ which are identical in shape and regularly distributed over all the metal clad faces of the insulator foil 10 form thus the matrix of tiny holes embodying the matrix of local electric field condensing areas in operation.

At FIG. 4*d*, a further particular embodiment of the matrix of tiny holes of the invention is shown in which each of the bored-through holes $1_i$ has a cross-section along a longitudinal plane of symmetry of this bored-through hole which is conical in shape.

Corresponding parameters are given now with respect to FIGS. 4*c* to 4*e* in which:

- P, T and S fully designate the same parameters as per FIGS. 4*c* and 4*e*, and
- $D_1$ designates the outermost dimension of one tiny hole formed at the level of first cladding 11, for example;
- $D_2$ designates the outermost dimension for a square tiny hole which is formed at the level of the second cladding 12;
- $d_1$ designates the outermost dimension for the bored-through hole within the insulator foil 10 at the level of first cladding 11;
- $d_2$ designates the outermost dimension for the square bored-through hole through the insulator foil and at the level of second metal cladding 12.

These dimensions are given in micro-meters. These parameters values are given thereafter as sizes example only with reference to tables I, II and III which are related to FIG. 4*c*, FIG. 4*d* and FIGS. 4*e*, 4*f* respectively.

TABLE I

| P | D | d | T | s |
|---|---|---|---|---|
| 140 | 110 | 60 | 50 | 15 |
| 200 | 130 | 70 | 50 | 18 |

TABLE II

| P | $D_1$ | $D_2$ | $d_1$ | $d_2$ | T | s |
|---|---|---|---|---|---|---|
| 200 | 160 | 120 | 75 | 60 | 50 | 5 |

TABLE III

| P | D | d | T | d |
|---|---|---|---|---|
| 200 | 130 | 100 | 50 | 18 |

Each of the bored-through holes $1_i$ as shown at FIG. 4*d* comprises thus a first and a second circular opening or substantially circular opening for given values which are different from each other and thus form a first and a second opening aperture diameter of different value at the level of the first 11 and the second cladding 12.

Figure 4F:
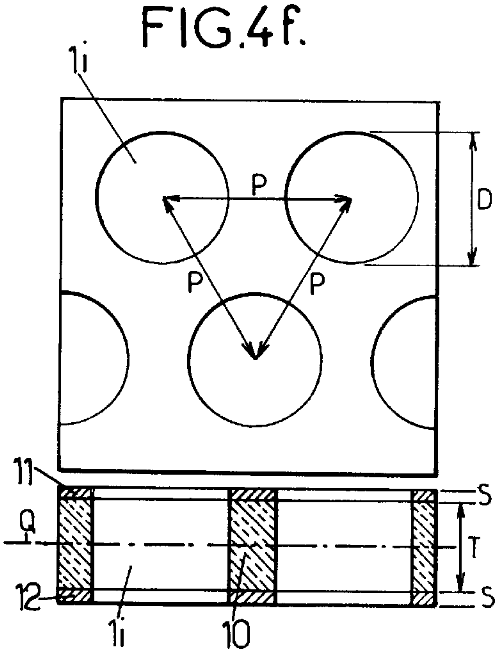

FIG. 4*f* refers to another particular embodiment in which each of the bored-through holes is fully circular in shape, all the way through. The dimensions given at FIG. 4*f* may thus well correspond to those given at table III, with d being thus equal to D. Such a matrix as shown at FIG. 4*f* can be obtained by laser drilling.

A more detailed mode of operation of the gas electron multiplier 1 embodying the radiation detector of the invention is now disclosed with reference to FIGS. 5*a*, 5*b* and 5*c*.

In operation, when a potential difference is applied between the first and the second metal cladding 11 and 12 of the mesh, very high localized electric fields as vector $\vec{E}'$ previously mentioned in the description are created within the open channel in the tiny holes, as shown at FIGS. 3*a*, 3*b* and 5*a*, 5*b*, 5*c*.

The electric field enhancement as shown at FIGS. 3*a* or 5*a*, 5*b* is large enough to induce an avalanche multiplication from any primary electron entering one of the field tube FT of the drift region as shown at FIGS. 3*a*, 3*b* or 5*a*.

FIG. 5*b* represents the distribution of the electric field lines and the potential lines at the level of one electric field condensing area of the gas electron multiplier 1 embodying a radiation detector in accordance with the object of the invention, with the electric field lines being represented in solid lines and the potential lines in phantom lines. It is particularly emphasized that provided a given potential difference VGEM is applied to the first 11 and second 12 metal-cladding of the gas electron multiplier 1 embodying a radiation detector in accordance with the present invention, no electric field lines do reach either the first and second metal-cladding 11 and 12 or the insulator foil 10 as it is clearly shown at FIG. 5*b*.

It is also emphasized with reference to FIG. 5*c* that the electric field distribution along an axis of symmetry designated as X'X at FIG. 5*b* or 3*a*, 3*b* is substantially symmetrical with respect to the intermediate surface Q which is the plane of symmetry with respect to FIG. 5*b* as shown at FIG. 5*c*. It should be borne in mind that since no field line from the drift region except for the mathematical boundary between cells or field tube FT terminates on the upper electrode, any local electric field condensing area $1_i$ provides thus a full transmission of any drift electron as an electron avalanche, the gas electron multiplier 1 embodying the radiation detection of the invention providing thus a full electrical charges transmission and, as a consequence, an electrical transparency that substantially equals 1. This electrical transparency should be distinguished over the optical transparency of the mesh embodying the gas electron multiplier 1 since this electrical transparency substantially equal to 1 is obtained for an optical transparency of the mesh which is defined as the ratio between the total surface of all the tiny holes embodying the local electric field condensing areas over the total surface of the metal clad insulator foil and thus is comprised between 10% and 50%. It is further emphasized that the high density of channels, i.e. of tiny holes, reduces thus the image distortions to values which are comparable to the intrinsic spread due to diffusion.

Figure 6A:
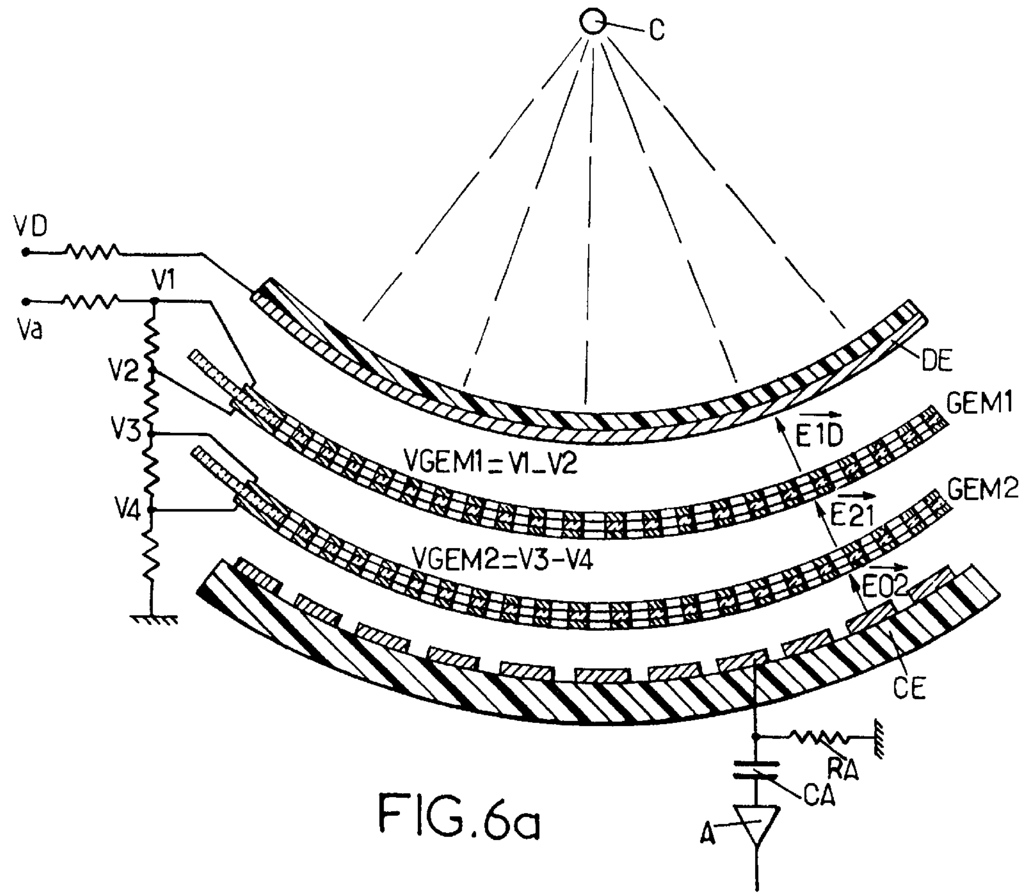
FIGS. 6*a* and 6*b* are each a schematic view of a radiation detector in accordance with the invention in which more than one matrix of electric field condensing areas are used so as to embody such a radiation detector.

A particular embodiment of the radiation detector of the invention is now disclosed with reference to FIG. 6*a*.

The gain or the amplifying factor of the radiation is in a direct relationship to the amplifying factor yield by the gas electron multiplier as disclosed in the description. This amplifying factor is in a direct relationship to the electric field enhancement and more particularly to the electric field amplitude value along the symmetrical axis of symmetry X'X of each tiny hole embodying one electric field condensing area together with the path length of the electron avalanche within one of the local electric field condensing area, and as a consequence, the thickness of the metal clad insulator foil 10. Insofar as the thickness is open to reach 100 $\mu$m with the tiny holes being drilled thanks to a laser processing as previously mentioned in the description, the amplifying factor which is defined as a ratio of the number of electrons of the electron avalanche entering the detection region to one primary electron yields those values to above 1000. With such a gain, or amplifying factor, the collecting electrode CE is adapted to operate at unity gain in ionization mode for example. In such a case, this electrode may consist of a plurality of elementary anodes as shown for example at FIGS. 1*a* to 1*c*, each elementary anode consisting for example of one strip or one pad of conductive material which allows an electronic detection of each electron avalanche. Each elementary anode as shown for example at FIGS. 2*a* and 2*b* is put at a reference potential such as a ground potential and is connected thanks to a capacitor CA to an amplifier A adapted to deliver a detection signal to a detection device which is not shown in the above-mentioned figures. The detection device is not disclosed for it is well-known per se to any person of ordinary skill in the corresponding art.

Thanks to its above mentioned electrical transparency that substantially equals one, the radiation detector of the invention may well be adapted to perform either monodimensional or bidimensional position detection. For such a purpose, as shown as a non-limitative example at FIG. 2*a*, the collecting electrode CE may be provided with elementary anodes $ST_i$ which are laid onto the face of an insulator foil or printed circuit board facing the gas electron multiplier 1, in case of monodimensional detection, with these elementary anodes each consisting of one electric conductive strip, these strips being thus parallel and extending along a first direction.

In case of bidimensional detection however further elementary anodes $ST_j$ may be provided on the other side of the insulator foil, and separated from the first ones, so as to form parallel electric conductive strips extending along a second direction transverse to the first one. The conductive strips $ST_i$ facing the gas electron multiplier 1 are preferably regularly spaced apart from each other so as to cover 50% only of the total surface of the collecting electrode CE, so as to allow any electron avalanche generated in front of any elementary anode $ST_i$ facing the gas electron multiplier 1 to also induce a corresponding detection signal onto corresponding elementary anodes $ST_i$ which are partially masked by the latters. The gain of detection amplifiers A embodying each detection circuit with capacitor CA and resistor RA may well be set up to different adapted values for each set of elementary electrodes, so as to introduce a good balance of the induced detection signal onto each set of elementary electrodes.

In order to improve the gain yield from the gas electron multiplier embodying a radiation detector in accordance with the invention as shown at FIG. 6*a*, a plurality of successive matrices of electric field condensing areas can be used, these matrices being in a cascade relationship over the primary electron stream, two matrices referred to as $GEM_1$ and $GEM_2$ being shown only for the sake of better comprehension at FIG. 6*a*. These successive matrices are put parallel to one another, i.e. in the absence of intersection, to define homothetic matrices over a common centre C forming the radiation detector as shown at FIG. 6*a*. As shown at this figure, two successive matrices are spaced apart from each other at a given separating distance value in a direction which is parallel to the corresponding electric field. As a consequence, the drift electrode DE, the first matrix or gas electron multiplier $GEM_1$, the second matrix or second gas electron multiplier $GEM_2$ and successive matrices together with the collecting electrode CE define therebetween successive electric fields which are referred to as vector $\vec{E}_{1D}$, vector $\vec{E}_{21}$, vector $\vec{E}$02and the like, each sucessive electric field allowing any primary electron or electron of one electron avalanche to drift as a primary electron along the separating distance thanks to its corresponding electric field.

Figure 6B:
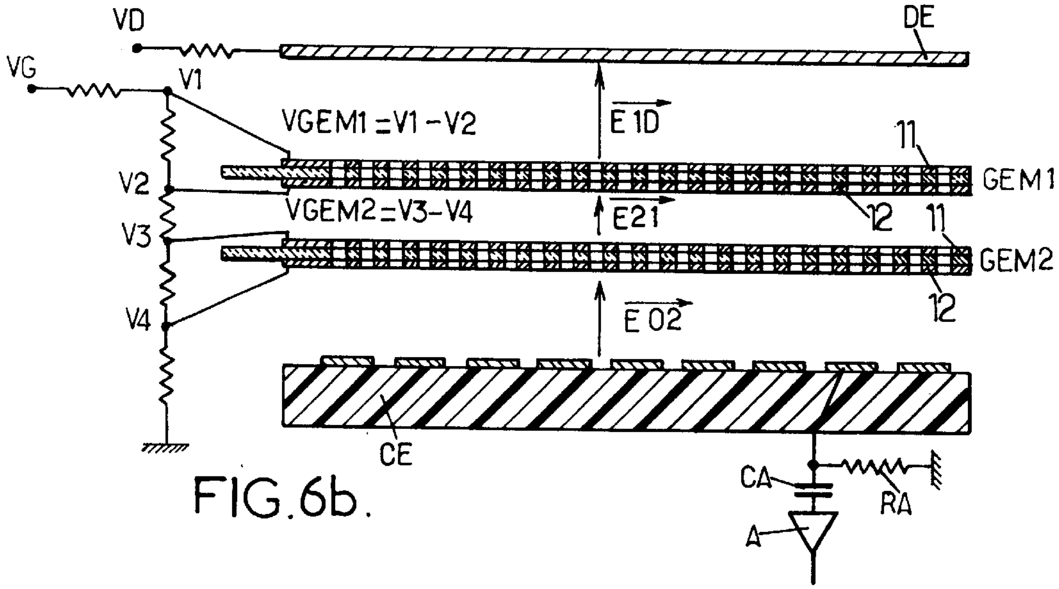

The gas electron multiplier formed by successive matrices as shown at FIGS. 6*a* and 6*b* cooperates thus as an amplifier, the gain of which is the product of the gain yield for each successive matrix. FIG. 6*b* actually represents a planar embodiment of the radiation detector shown at FIG. 6*a*. It is further recalled that for planar embodiments as shown at FIG. 6*b*, the common center C actually lies at an infinite distance.

The radiation detector of the invention as it has been disclosed up to now with reference to FIGS. 1*a* to 6*b* fully operates as an amplifier, the collecting electrode CE of which operates at unity gain and can thus be made of a simple and very cheap stripped printed circuit for which the total gain or amplifying factor is obtained from the gas electron multiplier only, either single or multiple gas electron multiplier as shown at FIGS. 6*a* and 6*b*.

Figure 7A:
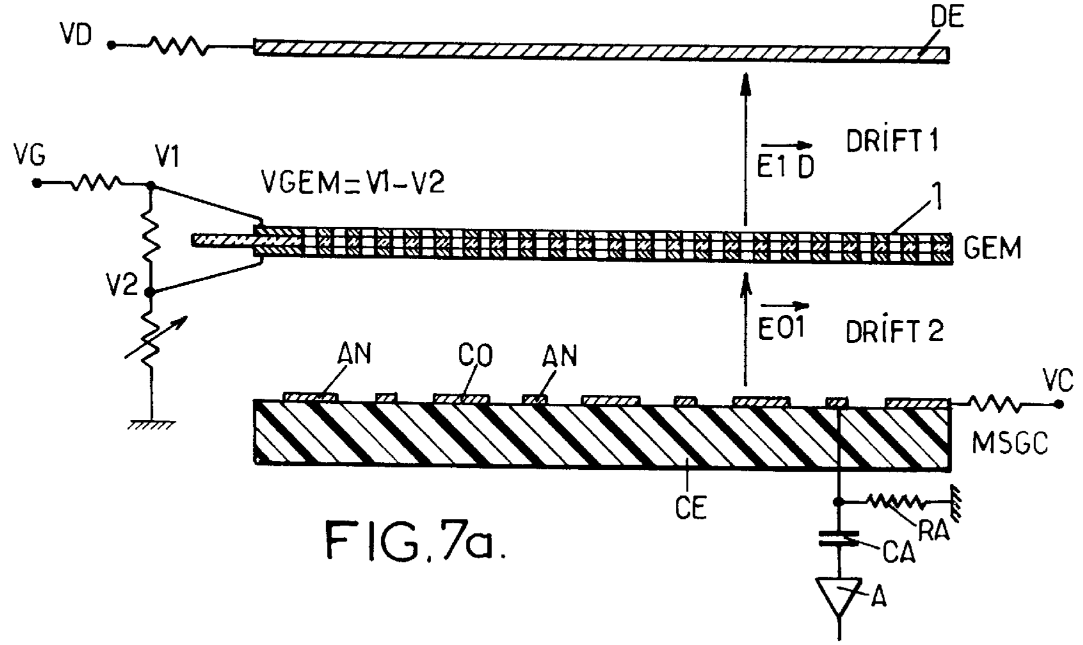
FIG. 7*a* is a schematic view of a gas electron multiplier in accordance with the present invention which is inserted into a particular radiation detector, the gas electron multiplier of the invention operating thus as a preamplifier for primary electrons.
Figure 7B:
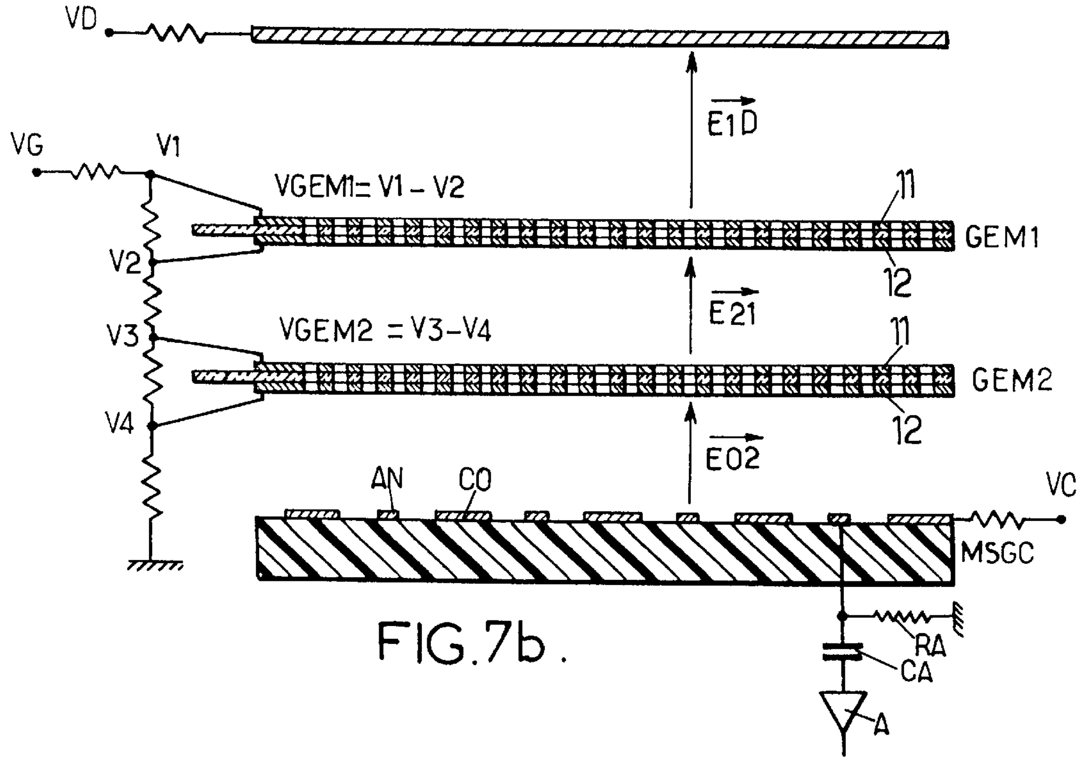
FIG. 7*b* is a schematic view representing successive gas electron multiplier in accordance with the present invention which are integrated within a particular host radiation detector, the successive gas electron multipliers operating thus as separate preamplifiers for the primary electrons.

Another way to embodying the radiation detector of the invention is now disclosed in which the gas electron multiplier 1 is inserted into a host detector which has its proper gain with reference to FIGS. 7*a* and 7*b*. The host detector, in a general way, may consist as a non-limitative example, as a well-known micro-strip gas chamber, thereafter designated as MSGC, or a multiwire proportional chamber. As shown at FIG. 7*a* in case of a MSGC, the collecting electrode CE consists now of successive anode electrodes designated as AN and cathode electrodes, referred to as CO, which are interleaved and distributed over a dielectric support so as to form the collecting electrode CE. Each of the anode electrodes AN is connected to the reference potential referred to as the ground potential through resistor RA and to an amplifier A so as to allow detection while each of the cathode electrodes CO is connected to a bias potential generator VC, the MSGC chamber having thus its own gain depending on the gain which is yield through amplification between each of the cathode electrodes and anode electrodes. As further shown at FIG. 7*a*, one gas electron multiplier 1 is further inserted between the drift electrode DE and the collecting electrode CE so as to define a first drift region, $drift_1$, and a second drift region, $drift_2$, which are separated from each other by the gas electron multiplier 1.

While proportional counters, multiwire chambers, and microstrip gas chambers, all exploit the basic amplification process of electron avalanche multiplication but differ only in their geometry and their performances, the maximum amplification factor that can be safely reached depends on many parameters and is limited by the probability of a catastrophic hazardous discharge in case too large gains, i.e. too large voltages, are used.

As an example, the microstrip gas chamber which is made with its thin and fragile metal strips appears particularly exposed to discharge damages. The sophisticated electronic circuits connected to the strips such as amplifier A as shown at FIG. 7*a*, can also be irreversibly damaged by these discharges.

Inserting a gas electron multiplier 1 as shown at FIG. 7*a* within for example a microstrip gas chamber with the gas electron multiplier being inserted on the path of electrons drifting in the gas under the effect of a moderate electric field comes to effect to pull the primary electrons which are generated in the first drift region, $drift_1$, into the tiny holes forming the local electric field condensing areas and multiply them in an avalanche in the high local electric field and thus push them out from the other side, i.e. in the second drift region, $drift_2$, with the primary electrons being multiplied by a factor of many hundreds.

The gas electron multiplier 1 of the invention operates thus as a preamplifier of given gain for the primary electrons upstream the collecting electrode CE of the radiation detector.

Provided the bias potentials which are put to the drift electrode DE and the collecting electrode CE, particularly to the cathode electrode CO and the first and second metal-cladding 11 and 12 of the gas electron multiplier 1 as shown at FIG. 7*a* are independent, such a configuration allows independent operation of the gas electron multiplier 1 and the microstrip gas chamber or multiwire proportional chamber as well as a controlled injection of ionization electrons into the preamplifying gas electron multiplier 1.

Such mode of operation is called preamplification mode and can be used to largely increase the electric charges to be detected. Combined with a multiwire or a microstrip gas chamber, it makes much easier and safer to detect small amounts of electric charges. While the combination of a gas electron multiplier 1 adapted to a multiwire proportional chamber or a microstrip gas chamber of corresponding shape can be performed with these shapes corresponding to spherical or cylindrical ones, the preamplification mode of operation of the gas electron module 1 of the invention appears of highest interest in case of multiwire proportional chamber or microstrip gas chamber of planar structure, the gas electron multiplier 1 in such a case corresponding also to a planar structure as shown at FIG. 7*a*.

As per FIGS. 6*a* or 6*b* to which the gas electron multiplier operates in amplification mode, combining several successive gas electron multipliers as shown at FIG. 7*b* appears of outmost interest so far these gas electron multipliers are adapted to operate independently since it is thus possible to achieve increasing large gains in a succession of elements with each of the elements being individually set at moderate amplification factor and therefore intrinsically safer to operate. As shown at FIG. 7*b*, two successive gas electron multipliers, referred to as $GEM_1$ and $GEM_2$, are shown to embody a resulting gas electron multiplier with each gas electron multiplier $GEM_1$, $GEM_2$ being set to yield a gain or amplifying factor to 100. The resulting amplifying factor is thus the product of each gain, then, as a consequence, has a value that equals 10 000.

Irrespective to its mode of operation, in order to operate the radiation detector of the invention which is shown at FIGS. 6*a*, 6*b* or 7*a*, 7*b*, the voltage potentials can be set up at the following values:

conducting strips of the collecting electrode CE of FIGS. 6*a* or 6*b* at the reference potential referred to as the ground potential;

anode AN of the collecting electrode CE of FIGS. 7*a* or 7*b* at the reference potential.

Figure 8A:
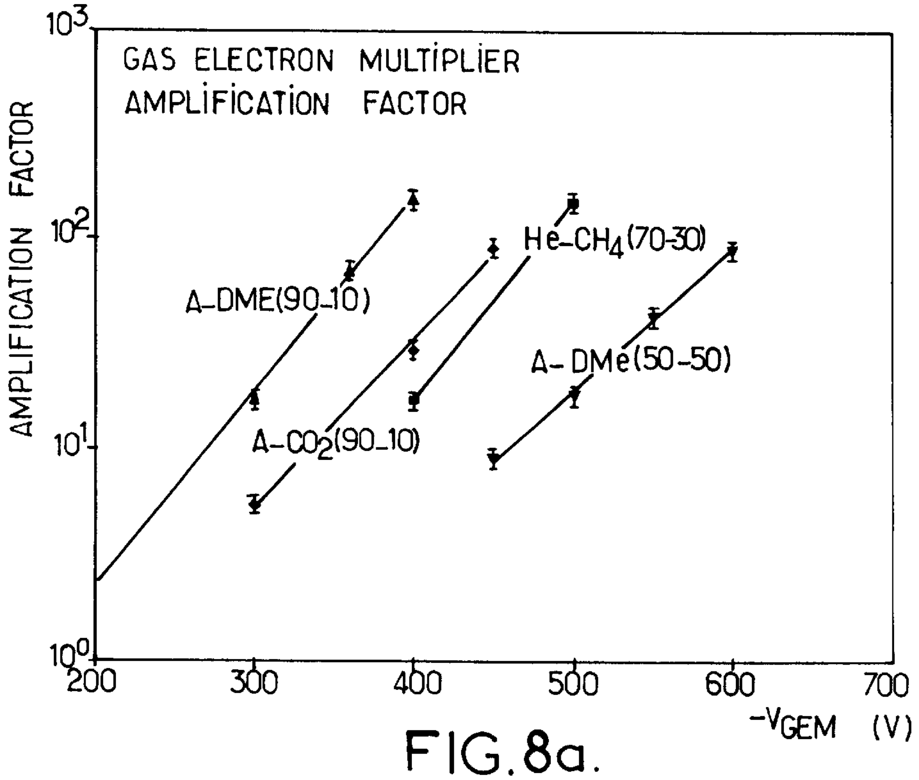
FIG. 8*a* is a diagram representing the amplification factor which is obtained for several gas mixtures filling a radiation detector in accordance with the invention, with this amplification factor being plotted with respect to the voltage potential which is applied to a matrix of local electric field condensing areas.

All the other voltage potentials set up with respect to the reference or ground potential. The following potential values are given as a non-limitative example for a given A-$CO_2$ (argon-carbondioxide) gas mixture, as shown at FIG. 8*a*, given gas electron multiplier geometry embodying an insulator foil 10 of thickness 50 μm and tiny holes of diameter 100 μm, this gas electron multiplier being operated with this gas mixture being at atmospheric pressure. Change of any parameter would imply correlative changes in the ranges of voltage potential values.

cathode potential VC to each cathode electrode CO at FIG. 7*a* or 7*b*, Vc=−500 V;

$V_4$ set up between −100 V and −1000 V;

$V_3$ set up between −600 V and −1500 V with $V_{GEM}$=−500 V;

$V_2$ set up between −1600 V and −2300 V;

$V_1$ set up between −2100 V and −2800 V with $V_{GEM}$=−500 V.

The distances separating the gas electron multiplier from the drift electrode, or the successive electrode CE were set up to 3 mm.

A multistage detector in accordance with the invention operating in either amplification or preamplification mode is thus functionally equivalent to a multidynonde photomultiplier except it operates in a gaseous environment while each matrix element of local electric field condensing areas has a much larger gain.

As compared to similar gas devices realized with stretched parallel metal meshes, the so-called parallel plate and multistep chambers, the gas electron multiplier which is the object of the invention is fully self-supporting since the multiplying gap and therefore the gain are kept substantially constant by the fixed thickness of the insulating foil regardless of the precise location of the gas electron multiplier within the detector or the host detector. Furthermore, heavy support frames are not necessary, this greatly simplifying construction and increasing reliability while reducing costs.

EXPERIMENTAL OBSERVATIONS

Extensive experimental measurements were realized with several types and models of gas electron multipliers, meshes as self-standing one's operating in amplification mode or in combination with host detectors and have been described in papers which are listed thereafter:

*Nuclear Instrum. Methods, Methods in Phys.Res.*A386 (1997)531; F. SAULI;

IEEE *Trans.Nucl.Sci.* NS-(1997); R. BOUCLIER, M. CAPEANS, W. DOMINIK, M. HOCH, J-C. LABBE, G. MILLION, L. ROPELEWSKI, F. SAULI and A. SHARMA;

*CERN-PPE*/97-32; R. BOUCLIER, W. DOMINIK, M. HOCH, J-C. LABBE, G. MILLION, L. ROPELEWSKI, F. SAULI, A. SHARMA and G. MANZIN;

*Progress with the Gas Electron Multiplier*, CERN-PPE/97-73; C. BUETTNER, M. CAPEANS, W. DOMINIK, M. HOCH, J-C. LABBE, G. MANZIN, G. MILLION, L. ROPELEWSKI, F. SAULI, A. SHARMA.

During those experimental measurements, preamplification factors above 100 have been observed in many gases and gas mixtures of noble gases such as helium, argon, xenon or the like with organic or inorganic quenchers like carbon dioxide, methane and dimethylether. FIG. 8*a* gives some examples of the gas electron multiplier amplification factor which is plotted in relation to the potential difference which is applied to the first and second metal-cladding 11 and 12 embodying one gas electron multiplier 1 in accordance with the invention. Experimental results as shown in FIG. 8*a* are given for a first mixture of:

Argon and dimethylether, thereafter designated as A_DME with 90% argon and 10% DME;

Argon and carbon-dioxide thereafter designated as A_$CO_2$ with a ratio of 90% argon and 10% $CO_2$;

Helium and methane, thereafter designated as $He_{\_CH4}$ with a ration of 70% helium and 30% methane;

Argon and dimethylether, thereafter designated as A_DME with a ratio to 50% argon and 50% DME.

Preceding ratios are given as volume ratios.

The voltage difference which was applied to the first 11 and second metal-cladding 12 was comprised between 200 and about 600 volts, thereafter designated as $V_{GEM}$.

Most measurements have been realized at atmospheric pressure convenient for the manufacture and operation of light and safe detectors but correct performance at pressure between few millibars and 10 bars revealed satisfactory.

A fundamental property of the gas electron multi plier embodying one radiation detector in accordance with the invention appears to be the wide range of electric fields strengths that can be applied above the mesh forming the matrix of local electric field condensing areas without affecting the gain actually yield. Such a property appears of highest importance because it makes the gas electron multiplier of the invention almost insensitive to large mechanical variations in the surrounding electrodes. As a consequence, such a property allows the choice of the drift field for optimal physical requirements as the value of the electrons drift velocity, diffusion and collection time.

A concern of high-rate applications is the behaviour of the gas electron multiplier embodying the radiation detector in accordance with the present invention under condition of large detected currents. While most of the electric charges, electrons and positive ions, smoothly drift in the open gas channel without affecting the operation, some stray charges may collect on the surface of the insulator with these stray charges distorting the field and therefore the gain thus obtained. It has been however demonstrated that a very small surface conductivity in the channel which is obtained very simply by the addition to the gas of a small amount not exceeding 1% of water vapor completely stabilizes the operation up to detected X-ray fluxes of $10^7$ Hz $cm^{-2}$ or more.

Other methods of increasing the surface conductivity to the desired value have been investigated such as ion implantation or vacuum evaporation of semi-conducting layers. It has thus been observed that using a polymeric foil embodying the insulator foil 10 with an intrinsic resistivity between $10^{12}$ and $10^{13}$ Ω×cm would properly solve the charging up problem in a natural way.

Figure 8B:
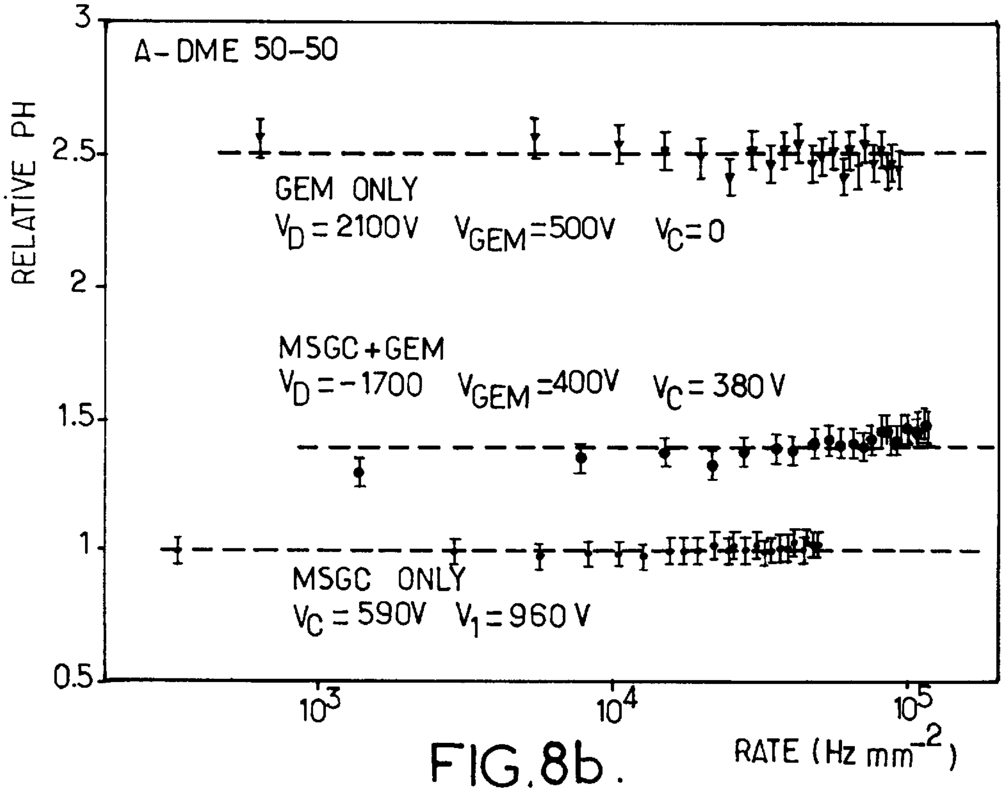
FIG. 8*b* is a diagram representing the relative pulse height obtained from a radiation detector in accordance with the invention which is formed from a MSGC chamber in which a gas electron multiplier is inserted as shown at FIG. 7*a* with the relative pulse height being plotted with respect to the count-rate expressed in $Hz/mm^2$.
Figure 8C:
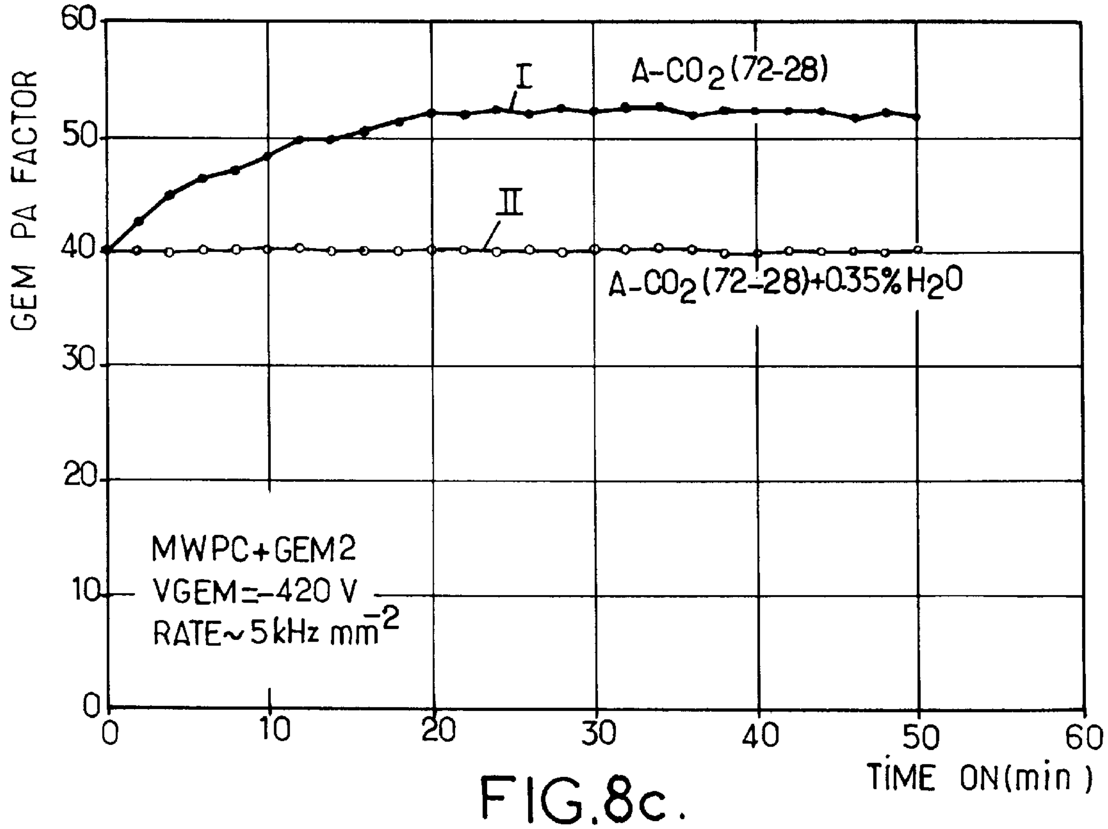
FIG. 8*c* is a diagram of comparative measures of the preamplifying or amplifying factor of a gas electron multiplier in accordance with the invention in case dry mixture of argon and carbon dioxide and a wet mixture of the latter is used as a gas filling the radiation detector in accordance with the invention, with the amplifying or preamplifying factor being plotted with respect to time expressed in minutes.
Figure 8D:
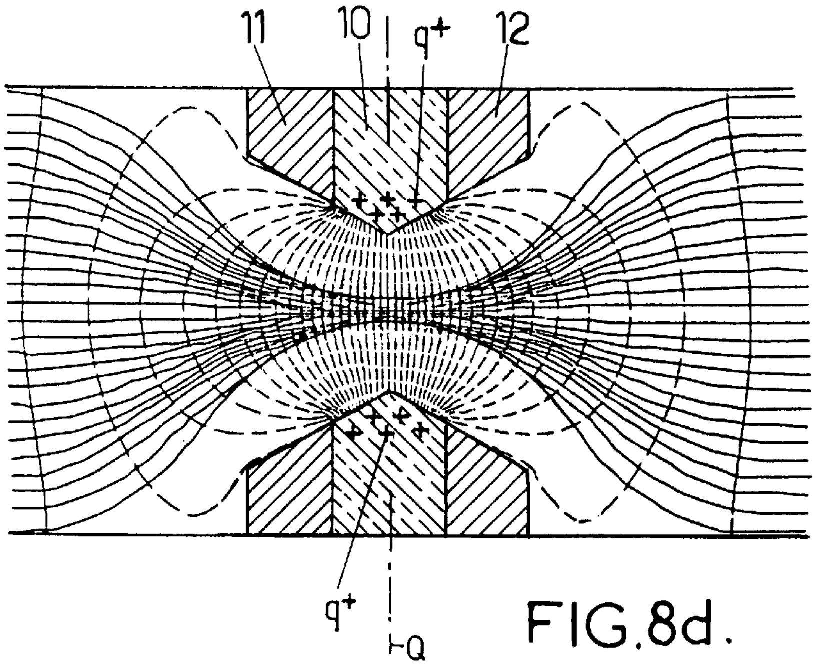
FIG. 8*d* is a preferred embodiment for one local electric field condensing area in which enhancement of the electric field along the central axis of symmetry of this local electric field condensing area is furthermore increased thanks to permanent electric charges which are implanted into particular zones of this local electric field condensing area.

As a consequence, as it is shown at FIG. 8*d*, each tiny hole or bored-through hole $\mathbf{1}_i$ is provided with an internal lateral surface which is delimited by the insulator foil 10. As clearly shown at FIG. 8*d*, this lateral surface comprises preferably one local zone with intrinsic resistivity between $10^{12}$ and $10^{13}$ Ω×cm. In a non-limitative way, as shown at FIG. 8*d*, this local zone is deemed to cover the extremal portion of the frusto-conical bored-through hole in which electric charges such as positive ions have been introduced through ion implantation for example.

With reference to FIG. 8*d*, it is clear to one of ordinary skill in the corresponding art that, thanks to the presence of the positive electric charges which are implanted at the extreme part of the frusto-conical profile of the insulator foil with these electric charges being distributed substantially with the same concentration all around the periphery of the tiny hole, i.e. in the vicinity of the medium plane or symmetry plane Q which was already mentioned with reference to FIG. 5*b*, the electric field lines are made very tight at the level of the intermediate plane or symmetry plane Q shown at FIG. 8*d* with the electric field being thus accordingly increased thanks to the preservative character of its flux within the modified solid surface or field tube FT through the presence of the implanted electric charges.

To detect the amount of the electrical charges which are released into a gas by soft X-rays or fast particles, about 100 electrons, amplification factors of 10 000 or so are necessary, given the limitations of modern highly integrated electronics. This can be achieved safely by combining one gas electron multiplier mesh with an amplifying factor of 100 together with a multiwire or microstrip gas chamber safely operated also at a gain of 100. The discrete nature of the electrodes in the host detector which are wires or strips allows then to achieve the electron avalanche localization.

It is also clear to one of ordinary skill in the corresponding art that this can also be achieved thanks to a radiation detector operating as an amplifier in which the collecting electrode CE is put at unity gain so far the gas electron multiplier 1 is enough thick to yield corresponding value of amplifying factor equal to 10 000 with the thickness of the sandwich structure being thus open to reach a thickness substantially equal to 500 μm, or by a multistage gas electron multiplier as shown at FIG. 6*a* or 6*b* for example.

Another fundamental property of the gas electron multiplier embodying the radiation detector of the invention is its high-rate capability while the gain or the relative pulse height of the radiation detector is substantially maintained at a constant value over its full rate range.

While the gain of the gas electron multiplier in accordance with the present invention has been defined as the ratio of the electrons number in the electron avalanche leaving the output face to the number of electrons of the primary electrons or the electrons entering the input face at the level of each local condensing area of the matrix embodying the gas electron multiplier, one mode of operation to evaluate such a gain may consist as an example to measure the preamplification factor or the amplification factor which is defined as a ratio of the most probable pulse height between transferred and direct spectra for the 5.9 keV line radiated by an external $^{55}Fe$ source.

As shown at FIG. 8*b*, the relative pulse height PH is plotted with respect to the rate expressed in Hz/$mm^2$ in three modes of operation of a gas electron multiplier inserted within a host detector which consists of a microstrip gas chamber in the following situations:

micro-strip gas chamber only, gas electron multiplier only, and multi-strip gas chamber and gas electron multiplier joined together.

The results which are shown at FIG. 8*b* clearly confirm the high-rate capability for the charge gain remains essentially constant within few percent up to the maximum rate that could be achieved, around $10^5$ Hz/$mm^2$, regardless of the mode of operation thus demonstrating the absence of short-term ion induced charging up or charge space effects in the local electric field condensing areas.

One should also note that the fraction of ions receding into and through the gas electron multiplier local electric field condensing areas depends on the applied voltages. In the mode of operation of unity gain of the micro-strip gas chamber with the gas electron multiplier being operative only, there are no positive ions produced in the lower gas volume and presumably no substrate charging up and ageing problems.

Another fundamental property of the radiation detector in accordance with the present invention which is embodied through a gas electron multiplier fully concerns the absence of time-dependent gain shifts.

While the presence of an insulator material close to the multiplication channels or the tiny holes is open to introduce the possibility of dynamic gain shifts due to the deposition of electric charges and the consequent modification of electric fields, this drawback can thus be fully overcome as already mentioned previously in the description, either by using a wet gas mixture in which a given proportion of water vapor is introduced or by giving particular values of electric conductivity to given zones of the internal part of each tiny hole forming a corresponding local electric field condensing area, as previously mentioned in the description.

With respect to this last solution consisting for example in implanting positive ions as it is shown at FIG. 8*d*, it is also emphasized that it comes to effect to repel the positive charges which are possibly generated by the electron avalanche towards the symmetry axis X'X as shown at FIG. 8*d* thereby allowing to reduce the charging up phenomenon of the insulator foil internal lateral surface while the electrons of the electron avalanche are quite unaffected by the presence of the implanted ions. The residual electric charges which are charged up by the internal lateral surface of the insulator foil has thus its contribution to the total electric field distortion drastically reduced, the charging up phenomenon being thus overcome.

FIG. 8*c* shows the variation of the pulse amplifying factor of one gas electron multiplier 1 in accordance of the object of the present invention, with this amplifying factor being plotted over the time during which the gas electron multiplier 1 is actually on, the time being expressed in minutes.

Corresponding curve I is given for a gas electron multiplier operated with a potential difference applied to the first 11 and second 12 metal-cladding of the sandwich structure which was put to 420 volts with the radiation detector being filled with a gas mixture of argon and carbon dioxide to a ratio 72%/28%.

The charging up phenomenon comes up to effect to increase the pulse amplifying factor for an initial value that equals 40 to a value greater than or substantially equal to 52 after 20 minutes the radiation detector is on.

Corresponding curve II is given for the same radiation detector as it was used to get curve 1 except that the gas mixture is further provided with water vapor to 0.35% in addition.

Curve II clearly shows the full constant character of the pulse amplifying factor which substantially equals 40 all over the time the radiation detector of the invention is on, that is from the very beginning to the end of the experiment 50 minutes later.

It should be thus understood that after the addition of water vapor, the inter-electrode resistivity of the gas electron multiplier mesh decreases gradually by a factor of 10, from 100 to 10 GΩ, and then remains constant. Taking into account the total area of the channels and particularly of the tiny holes embodying the latters, this clearly indicates that a surface resistivity around $10^{16}$ Ω/square is sufficient to eliminate the charging up phenomenon as the highest rates. The original value of resistivity as well as the final one after introduction of water depend on the total area and the number of tiny holes. Preceding values refer to a 10×10 $cm^2$ gas electron multiplier 1 provided with about $5\times10^5$ tiny holes.

Particular embodiments well adapted to specific applications are now described with reference to FIGS. 9*a*, 9*b* and 9*c*.

Each of the above-mentioned embodiments is well adapted to operate either on amplification or preamplification mode as previously disclosed in the description. It is furthermore emphasized that the amplification mode may well be preferred for applications in which ionizing radiations of very high energy level are to be investigated.

Figure 9A:
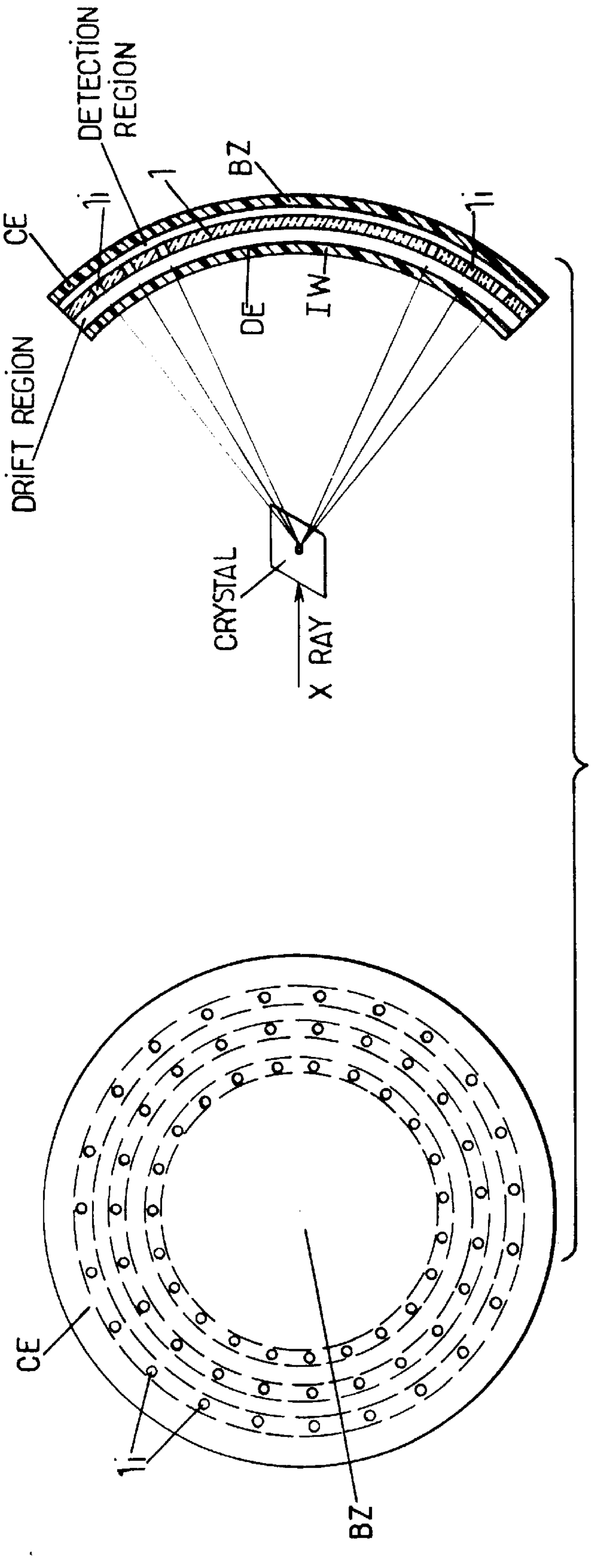
FIG. 9*a* is a front view of a radiation detector in accordance with the present invention which is particularly adapted to be used for crystallography experiments.

Accordingly, FIG. 9*a* shows the radiation detector of the invention in which the sandwich structure forming a gas electron multiplier 1 is provided which is spherical in shape. This radiation detector may well correspond to that which is shown at FIG. 1*c* with the external form of the detector being circular in shape as shown at the front view of FIG. 9*a*. This radiation detector is adapted to crystallography trials in which X rays are directed to a crystal, the radiation detector of the invention being thus adapted to allow a full detection of the diffraction pattern generated by the impingement of the X-rays onto the crystal. As clearly shown at FIG. 9*a*, the bored-through holes forming the electric field condensing areas are regularly distributed over a part only of the metal-clad faces of the insulator foil so as to form at least one blind detection zone which is referred to as BZ for the radiation detector. The blind detection zone is thus substantially spherical in shape and located at the center part of the sandwich structure with the bored-through holes being distributed all around this blind detection zone so as to allow detection of the diffraction pattern out of this blind detection zone only. Particularly in case the radiation detector of the invention as shown at FIG. 9*a* is used in amplification mode, that is in the absence of micro-strip or multiwire chamber as final amplifier, it allows to adapt the collecting electrode CE shape to the needs with this electrode for example consisting of strips, pads or rings, the rings being particularly adapted in case of crystal diffraction measurements. At FIG. 9*a*, the rings forming the collecting electrode CE are shown in phantom line for better comprehension and clarity of the drawings.

FIGS. 9*b* and 9*c* are concerned with radiation detectors in accordance with the present invention which are more particularly adapted and suited for colliding beams accelerators or very high energy particles colliding ring accelerators like that which is in operation at the CERN (Centre Européen de Recherche Nucléaire) in Geneva, Switzerland. At FIGS. 9*b* and 9*c*, the colliding ring accelerator, owing to its very high curvature radius, is represented as a straight portion. As shown at FIGS. 9*b* and 9*c*, the gas electron multiplier embodying the radiation detector in accordance with the invention consists of a solid surface made of adjacent elementary solid surfaces, each elementary solid surface forming one elementary gas electron multiplier which comprises at least one matrix of electric field condensing area so as to form elementary detectors which are referred to as $RD_1$ to $RD_9$. The elementary detectors are joined to one another so as to form a three-dimensional radiation detector which surrounds the colliding ring accelerator as shown at FIGS. 9*b* and 9*c*.

The three-dimensional detector shown at FIG. 9*b* is spherical in shape and formed from elementary radiation detectors which are each spherical in shape and fully correspond to the radiation detector in accordance with the present invention which is shown at FIG. 1*c* with elementary detectors $RD_1$, $RD_2$, $RD_3$ and $RD_4$ being designed so as to form a skullcap while the other elementary detectors are design as a part of a corresponding volume spherical in shape. Elementary detectors $RD_2$ and $RD_3$ may well be provided with a central blind detection zone, as already shown at FIG. 9*a*, this blind detection zone being further drilled so as to allow the colliding ring accelerator to pass through. Each elementary radiation detector may be manufactured as the radiation detector shown at FIG. 1*c* by thermo-forming all its constituting parts such as the input window and drift electrode, the sandwich structure and the collecting electrode CE together with the intermediate frames which are necessary to build up any radiation detector or elementary radiation detector in accordance of the present invention. As shown at FIG. 1*a* or 1*c*, in order to embody one elementary radiation detector as shown at FIG. 9*b* or 9*c*, the gas inlet and gas outlet GI and GO may be removed and replaced by bored-through holes with the bored-through holes forming the gas inlet and gas outlet of two neighbouring adjacent elementary radiation detectors, such as $RD_2$ and $RD_5$ at FIG. 9*b*, these bored-through holes being put to face each other and to be sealed thanks to O rings. The electrodes terminals which are adapted to apply the difference potential to the input and output face formed by the first and second metal-cladding 11 and 12 as shown at FIGS. 1*a* and 1*c*, are reduced and adapted to further allow the interconnecting of the first and second metal-cladding respectively of two successive adjacent elementary radiation detectors, the same difference potential voltage being thus applied to each gas electron multiplier embodying each elementary radiation detector which as a consequence yield the same gain.

As further shown at FIG. 9*a*, one general gas inlet GI and gas outlet GO only are provided which are preferably located close the blind zone in the vicinity of the colliding ring accelerator. The same for the electrodes 110 and 120, one of these electrodes only being thus provided to allow a same difference voltage potential VGEM to be applied to each elementary first 11 and second 12 metal-cladding.

FIG. 9*c* is directed to a three-dimensional radiation detector which is substantially cylindrical in shape at the extremities of which two elementary half-spherical radiation detectors are abutted. The elementary half-spherical radiations detectors may well consist of one or several elementary radiation detectors thereafter designated as $RD_1$, $RD_2$, $RD_8$, $RD_9$ with elementary radiation detectors $RD_1$ and $RD_9$ playing the same role as the elementary detectors as $RD_2$ and $RD_3$ at FIG. 9*b*. The length of the cylindrical part as shown at FIG. 9*c* may extend along the colliding ring accelerator for several meters with this cylindrical part consisting of several adjacent elementary radiation detectors thereafter designated as $RD_3$ to $RD_7$. In order to allow three-dimensional radiation detectors of great dimensions to be operated, the inner part of these detectors as shown at FIGS. 9*b* and 9*c* may well be filled outside the inlet window of each elementary radiation detector with a foam which is substantially transparent to the X or gamma rays of very high energy.

A radiation detector of very high efficiency, in accordance with the present invention, has thus been disclosed in which a gas electron multiplier may be used in the field of elementary particle experiments.

Generally speaking, embodying a radiation detector in accordance with the invention operating in the preamplification mode with the gas electron multiplier mounted within a micro-strip gas chamber for example, allows to operate such a sophisticated but fragile device in much safer conditions.

Several new experiments embodying a gas electron multiplier in accordance with the object of the invention were actually conducted.

One first new approved experiment, thereafter designated as HERA-B at DESY in Hamburg, Germany (DESY, for Deutsche Elektron Synchrotron) qualified and adopted the gas electron multiplier of the invention, in order to improve the reliability of the high rate host tracking detector.

One second new approved experiment, thereafter designated as COMPASS at CERN, came to adopt the gas electron multiplier technology in accordance with the invention for similar reasons.

Another proposed new experiment designated as FELIX and conducted at the CERN (Centre Européen de Recherche Nucléaire) in Geneva is carried out so as to improve radiation detectors operating in the amplification mode in the cylindical geometry.

Another detector, thereafter designated as HELLAZ, is proposed for large cosmic rays experiment in the Italian Laboratory under the GRAN SASSO with the aim of achieving large enough gains to detect single electrons.

A further particular use of the gas electron multiplier of the invention may also consist to prevent transmission of electrons and/or ions through the control of external voltages. As shown for example at FIG. 2*a* or 2*b*, the biasing source 2 may well consist of two detening voltage generators of opposite polarity that can be switched through a common switch K. Operating the switch K allows the difference voltage potential VGEM to be reversed so as to allow to prevent transmission of electrons and/or ions, the sandwich structure operating thus as an active gate, the enhanced electric field being thus strong enough to repel given electric charges ions or electrons.

Figure 10:
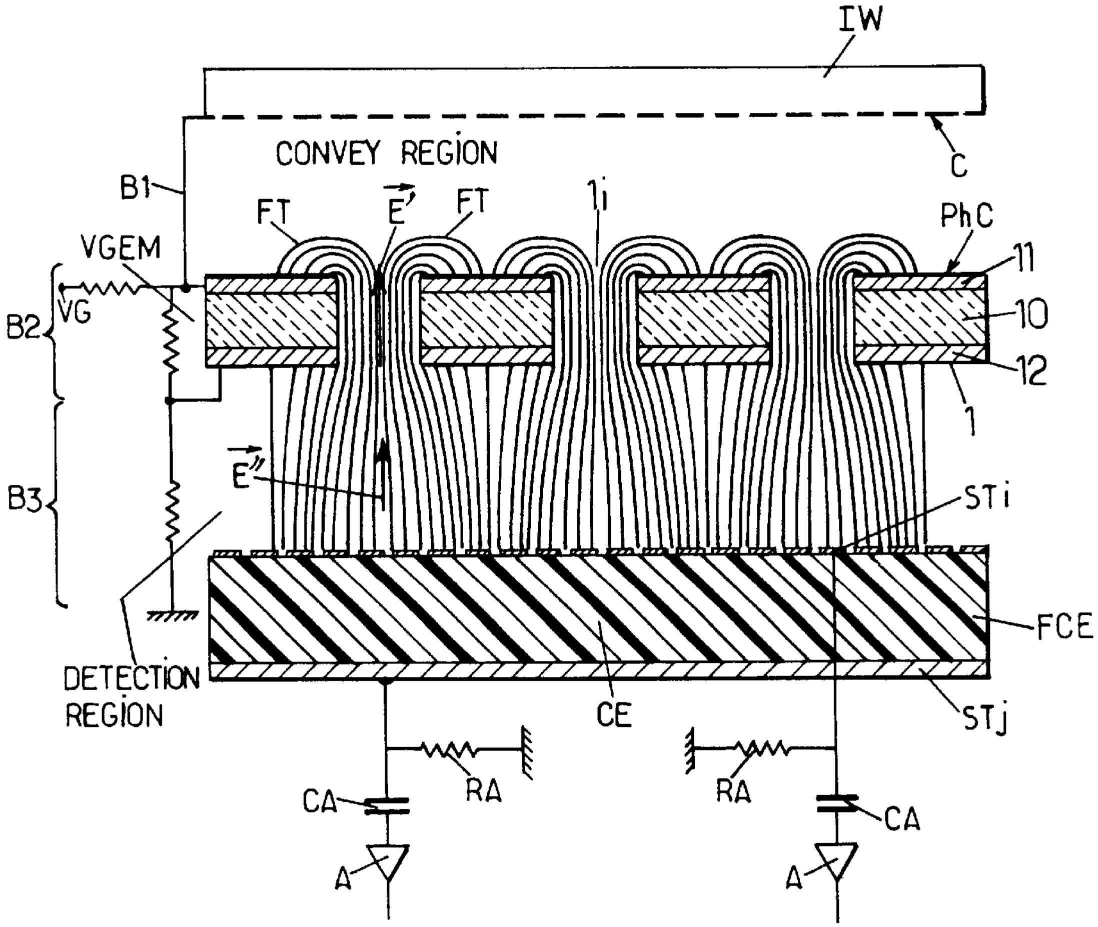
FIG. 10 is a cross-section view like FIG. 3*a*, of a non limitative embodiment of the radiation detector of the invention which is more particularly directed to photons detection.

A further embodiment of the radiation detector in accordance with the object of the present invention is now disclosed with reference to FIG. 10.

This embodiment is more particularly directed to a radiation detector for photons which are emitted by an external source.

The operating principle of the gas electron multiplier 1 which is the object of the present invention operating as a photon detector relies on the following specific properties of its structure:

- a controlled electrical transparency, from 0 to 1, actually depending on the voltage potentials which are applied on the various electrodes of a composite structure operating either as an amplifier or a preamplifier and including thus a gas electron multiplier as previously disclosed in the description;
- a geometry controlled optical transparency from about 10% to 50% which is obtained by appropriate patterning during manufacturing;
- a demonstrated operation with gain in pure and inert gases which actually proved harmless to photocathode materials, and the existence of photocathode materials operating in many particular wavelengths either visible or invisible ones that have large quantum efficiency and long survivability in a gaseous environment.

The schematics of a reverse photocathode, gas electron multiplier, photon detector in accordance with the object of the present invention is shown at FIG. 10 together with its corresponding features and electric field lines.

As previously disclosed in the description with reference to FIG. 3*a* for example, the radiation detector for photons which is the object of the present invention consists of a vessel, which is not shown at FIG. 10 for the sake of better comprehension, with this vessel being filled with a gas adapted to generate an electron avalanche from a primary electron through an electric field.

An inlet window IW is further provided which is associated with a transparent electrode denoted as C, this inlet window and transparent electrode being adapted to transmit the photons within the gas contained by the vessel. The inlet window IW and transparent electrode C are made of a material which is substantially transparent to the photons wavelength. Well-known technology may be used so as to put the inlet window IW and the transparent electrode C together, the transparent electrode for this reason being represented with phantom line only at FIG. 10.

As further shown at the above-mentioned figure, a photocathode layer, denoted as PhC, faces the transparent electrode C with this photocathode layer being adapted to generate one photo-electron as a primary electron under impingement of each one of the photons onto this photocathode layer.

A gas electron multiplier 1 is further provided so as to include at least, as previously mentioned in the description, one matrix of electric field condensing areas which is formed from the foil metal clad insulator 10 provided with metal cladding 11 and 12 onto its faces, with metal cladding 11 facing the transparent electrode C. As clearly shown at FIG. 10, the photocathode layer PhC, the metal claddings 11 and 12 together with the insulator foil 10 form thus a regular sandwich structure as previously mentioned in the description. Furthermore, a plurality of bored-through holes denoted $\mathbf{1}_i$ traverse thus the regular sandwich structure with each of the bored-through holes being adapted to allow a free flowing therethrough for the gas and any electrically charged particle generated within the latter. As a matter of fact, in order to embody the electron gas multiplier 1 as shown at FIG. 10, one may well have first a metal clad insulator provided with metal claddings 11 and 12 onto one of the faces of which a layer of photosensitive material is deposited so as to build up the photocathode layer PhC. The bored-through holes may thus be drilled according to anyone of the technologies which are actually disclosed in the description.

As shown at FIG. 10, inlet window IW and transparent electrode C are spaced apart to form a convey region which operates in a similar way as the drift region of FIG. 3*a*, as it will be disclosed in more details later in the description.

On the bottom side of the vessel, the detector of the invention further includes a detection unit adapted to perform a position detection of any electron avalanche generated within the detection region which is formed between the gas electron multiplier 1 and the detection unit as shown at FIG. 10. For the sake of better comprehension, the detection unit is represented as a collecting electrode CE as previously mentioned with reference to FIGS. 2*a* or 3*a*. It is further emphasized, although not represented for the sake of better comprehension at FIG. 10, that the detection unit may well include another gas electron multiplier so as to form a multistage gas electron multiplier as previously mentioned in the description or a microstrip chamber or even a multiwire chamber for example.

To the contrary, as shown at FIG. 10, the top electrode of the collecting electrode CE is provided with elementary anodes, each of which is denoted $ST_i$, with these elementary anodes consisting for example as parallel electric conductive strips which are laid onto an insulator foil denoted CEF. Electronic circuits consisting of resistor RA, capacitor CA and amplificator A, are further provided as previously mentioned in the description.

As further shown at FIG. 10, a biasing circuit referred to as $B_1$, is provided and adapted so as to maintain the transparent electrode C and the first metal cladding 11 substantially to the same voltage potential value with respect to the reference potential value so as to allow extraction of any photo-electron which is generated by the photocathode layer PhC under impingement onto the latter of each one of the emitted photons. Biasing circuit $B_1$ is represented thus as a short-circuit conductor.

A further biasing circuit, referred to as $B_2$, is provided so as to develop a bias voltage potential referred to as VGEM which is applied between the metal claddings 11 and 12 so as to form at the level of each of the bored-through holes one of the electric field condensing areas $\mathbf{1}_i$ as previously mentioned in the description. Applying such a voltage allows thus to generate a condensed electric field denoted as vector $\vec{E}'$ within each of the electric field condensing area.

Another biasing circuit, referred to as $B_3$, is further provided so as to develop a bias voltage potential which is actually applied between metal-cladding 12 and collecting electrode CE and more particularly elementary anodes referred to as $ST_i$ at FIG. 10 so as to allow the detection of the electron avalanche as it will be explained thereafter.

At first, it is recalled that each elementary anode $ST_i$ forming part of the collecting electrode CE is substantially set up as a reference potential thanks to resistor RA which is a resistor of very high value connecting each corresponding elementary anode to the reference potential.

The mode of operation of the radiation detector for photons as shown at FIG. 10 is now explained with reference to this figure.

Maintaining the transparent electrode C and the metal-cladding 11 which faces the transparent electrode substantially to the same voltage potential value thanks to biasing means $B_1$ comes to effect to put the electric field vector $\vec{E}$ shown at FIG. 3*a* to a value that substantially equals 0.

As a consequence, each condensed electric field vector $\vec{E}'$ generated within each electric field condensing area, which is thus an electric field of very high amplitude value, operates thus within the region delimited between the transparent electrode C and the metal-cladding 11 and photocathode layer PhC as to convey each of the photoelectron to one given electric field condensing area which is the closest of the impingement region of this photon within the fill tube FT which is actually generated between metal-cladding 11 and collecting electrode CE, as shown at FIG. 10. Cancelling the electric field vector $\vec{E}$ with its amplitude being quite set up to zero value in the vicinity of transparent electrode C as shown at FIG. 10 comes thus to the effect of substituting a convey region to the drift region which is represented at FIG. 3*a*. As a consequence, the field tube FT is thus folded back to the metal-cladding 11 with any photo-electron being thus conveyed to within a corresponding electric field condensing area $\mathbf{1}_i$. The condensed electric field vector $\vec{E}$ operates thus to generate from this photo-electron regarded as a primary electron one electron avalanche within corresponding bored-through hole with this electron avalanche being thus passed through this bored-through hole to the detection region, as shown at FIG. 10. The electron avalanche is thus submitted to detection thanks to electric field vector $\vec{E}''$ and elementary anodes $ST_i$ of the collecting electrode CE.

For distances separating on the one hand the transparent electrode C from the photocathode layer PhC and on the other hand metal-cladding 12 from elementary anodes $ST_i$ defining thus the convey region and the detection region, which have quite the same values as those previously mentioned with reference to FIG. 3*a*, corresponding voltage potential values may well be set up to similar values. As a consequence, potential value VGEM may well be set up to 500 volts while potential value applied between metal-cladding 12 and elementary anodes $ST_i$ may be set up to 1000 volts, with this values being thus given as an example.

As further shown at FIG. 10, position detection of any avalanche which is passed through any electric field condensing area $\mathbf{1}_i$ may preferably be performed as a bidimensional detection. In such a case, while the inner face of the collecting electrode CE is provided with a first set of elementary anodes $ST_i$, the outer face of same collecting electrode CE is thus provided with another set of elementary anodes referred to as $ST_j$ consisting also of parallel electric conductive strips, with each of the sets of elementary anodes $ST_i$ and $ST_j$ extending along distinct transverse directions so as to allow bidimensional detection in corresponding directions.

In case a further electron gas multiplier is used so as to embody a multistage radiation detector for photons, the multiplied electrons by the high field in the hole in avalanche process drift to the second element of amplification for further amplification.

A fundamental property of the radiation detector for photons either as single stage or multistage version, which cannot be obtained with any other known gas detector, is that secondary photons produced during the electron avalanche process, both primary in the bored-through holes forming each electric field condensing area of the gas electron multiplier and secondary in the second stage element, cannot heat the photocathode layer PhC thereby preventing to induce secondary emission.

The high dipole field which is created within the bored-through holes allow thus to obtain a collection efficiency, i.e. electrical transparency close to unity with an optical transparency close to zero.

The large ratio of the total area to the holes area implies also that most of the surface of the metal-cladding 11 an thus be coated by photosensitive material with a geometrical quantum efficiency close to 1. The field configuration which is obtained with a large difference of potential between metal-cladding 12 and elementary anodes $ST_i$ is such that only a small fraction of the positive ions which are produced at the final amplification stage can thus actually reach the photocathode layer PhC reducing thus the damage effects.

The radiation detector for photons in accordance with the object of the present invention permits thus to obtain simultaneously:

large quantum efficiency of over extended areas, large gains without photons feed-back and very reduced ions feed-back.

The total combined gain of the two amplification elements in case of a multistage gas electron multiplier may thus be set up to a value sufficient enough for the detection and localization of single photo-electrons opening thus the way to numerous scientific, technical or industrial applications like CHERENKOV ring imaging, image intensifiers, fluorescence analysis in the visible and near ultraviolet range, or any applications requiring detection and localization of photons over extended areas.

The rigid and simple construction of gas electron multiplier detectors in accordance with the object of the present invention, either in preamplification or amplification mode, makes them interesting for applications in many fields where low and high rate detection and localization of radiation can be exploited for industrial or medical diagnosis.

Medical diagnosis covers corresponding medical fields as large as:

Radio and beta-chromatrography, electrophoresis in which anatomical preparations or blot paper diffusions contain molecules labelled with electron emitting isotopes, the two-dimensional activity distribution measured on slide samples which provides information on the tissue in take off labelled molecules or on the molecular weight of substances diffusing on a support under the effect of electric field;

Position-dependent fluorescent analysis in which the capability of simultaneous obtention of information on the energy and the emission point of soft X-rays over extended areas can be exploited for material analysis in Archeology and Art certification;

Protein crystallography which is realized in a spherical geometry for which gas electron multipliers detectors can map without parallax distortions both position an intensity of the diffraction pattern of crystallized molecules. High rates are achievable at the dedicated synchrotron radiation facilities;

Mammography in which a gas electron multiplier in accordance with the invention when coupled to a secondary electron emitted converter can effectively map the absorption profile of X-rays which are used for soft tissue radiography, with a sub-millimeter resolution;

High flux beam diagnosis which is used for therapy in which high flux charged particle beams can be fully certified in spatial and energy loss profiles before or during exposure. In such an application, the dynamic control of the beam characteristics is thus possible.

One further possibility of the radiation detector of the invention also concerns the possibility for the gas electron multiplier to be tailored to applications or specific needs and particularly its shape with special cut outs as for approaching vacuum beam tubes in accelerators or the like.

At end, while present technologies which are used to manufacturing the gas electron multiplier embodying the radiation detectors of the invention do consist in drilling holes on metal clad by chemical etching, plasma etching or laser drilling, future developments may consist in coating with conductors an insulating mesh with narrow holes like for example micropore filters.

What is claimed is:

1. A radiation detector in which primary electrons are released into a gas by ionizing radiations and are caused to drift to a collecting electrode by means of an electric field, said radiation detector including a gas electron multiplier comprising at least one matrix of electric field condensing areas, said electric field condensing areas being distributed within a solid surface which is substantially perpendicular to said to said electric field, each of said condensing areas producing a local electric field amplitude enhancement sufficient to generate in said gas an electron avalanche from one of said primary electrons so that said gas electron multiplier operates as an amplifier of a given gain for said primary electrons, said matrix of electric field condensing areas comprising:

an insulator having first and second foil metal claddings on opposed faces thereof forming a sandwich structure;

a plurality of through holes traversing said sandwich structure; and biasing means for developing a bias voltage potential which is applied to said first and second metal claddings so as to generate, at each of said through holes, one of said electric field condensing areas, and said sandwich structure being disposed substantially perpendicular to said electric field, said first metal cladding forming an input face for said drift electrons and said second metal cladding forming an output face for any electron avalanche generated at each through hole forming one of said electric field condensing areas.

2. The radiation detector of claim 1, wherein said local electric field amplitude enhancement generated by each of said condensing local areas is substantially symmetrical in relation to an axis of symmetry of said condensing local area, so that said local electric field amplitude enhancement is at a maximum at the center of symmetry of said condensing local area.

3. The radiation detector of claim 1, wherein said electric field condensing areas are substantially identical in shape and regularly distributed within said solid surface so as to form said matrix.

4. The radiation detector of claim 1, wherein said through holes are substantially identical and circular in shape in viewed in a direction substantially perpendicular to said sandwich structure.

5. The radiation detector of claim 1, wherein each of said through holes is formed by first and second frusto-conical bored holes said first frusto-conical bored hole substantially extending from said first metal-cladding to an intermediate surface of said sandwich structure and said second frusto-conical bored hole substantially extending from said second metal-cladding to said intermediate surface of said sandwich structure, said first and second frusto-conical bored holes each comprising a first circular opening of a diameter of a first given value at the level of said input and output faces respectively to and a second circular opening of a diameter of a second given value, smaller than the first ones, said second circular opening of said first and second frusto-conical bored holes joining together at the level of said intermediate surface of said sandwich structure so as to form said bored-through hole.

6. The radiation detector of claim 1, wherein said through holes are identical in shape and regularly distributed over all of the metal clad faces of said insulator foil.

7. The radiation detector of claim 1, wherein said through holes are identical in shape and regularly distributed over a part of the metal clad faces of said insulator foil so as to form at least one blind detection zone for said radiation detector.

8. The radiation detector of claim 1, wherein said solid surface is a planar surface.

9. The radiation detector of claim 1, wherein said solid surface is spherical in shape.

10. The radiation detector of claim 1, wherein said solid surface is cylindrical in shape.

11. The radiation detector of claim 1, wherein said solid surface comprises adjacent elementary solid surfaces, each of said elementary solid surfaces forming thus one elementary gas electron multiplier comprising at least one matrix of electric field condensing area.

12. The radiation detector of claim 1, in which said collecting electrode is adapted to operate at unity gain, in an ionization mode, said collecting electrode at least comprising a plurality of elementary anodes allowing an electronic detection of each electron avalanche.

13. The radiation detector of claim 1, comprising a plurality of successive matrices of electric field condensing areas, said successive matrices being disposed parallel to one another to define homothetic matrices over a common center forming said gas electron multiplier and two successive matrices of said successive matrices being spaced apart from each other by a given separating distance in a direction parallel to said electric field forming a first electric field so as to define therebetween successive electric fields and to allow any electron of one electron avalanche to drift as a primary electron along said separating distance by means of its corresponding electric field so that said gas electron multiplier operates as an amplifier having a gain which is the product of the gain yield from each successive matrix.

14. The radiation detector of claim 1, wherein said collecting electrode comprises, on an insulator foil:

a first set of elementary anodes disposed on a first face of said insulator foil, said first face of said insulator foil and said first set of elementary anodes facing said gas electron multiplier, said first set of elementary anodes comprising a plurality of parallel electric conductive strips extending along a first given direction;

a second set of elementary anodes disposed on a second face of said insulator foil, said first and second sets of elementary anodes being separated by said insulator foil, said second set of elementary anodes comprising a plurality of parallel electric conductive strips extending along a given direction, transverse to said first given direction, and said first and second sets of elementary anodes thereby enabling detection of said electron avalanche along said second and first directions, respectively, so as to form a bidirectional radiation detector.

15. In a radiation detector in which primary electrons are released into a gas by ionizing radiations, said radiation detector comprising a drift region from which said primary electrons are caused to drift by means of a substantially parallel electric field, a collection region, a gas electron multiplier located between said drift region and said collection region and comprising at least one matrix of electric field condensing areas, said electric field condensing areas being distributed within a solid surface which is substantially perpendicular to said parallel electric field, each of said condensing areas producing a local electric field amplitude enhancement to generate in said gas an electron avalanche from one of said primary electrons such that said gas electron multiplier operates as a preamplifier of given gain for said primary electrons upstream said collecting electrode of said radiation detector, and a collecting electrode for collecting from said collection region electrons produced by said electron avalanche, said matrix of electric field condensing areas comprising:

an insulator having first and second metal claddings on opposed faces thereof so as to form a planar sandwich structure;

a plurality of through holes extending transversely through said planar sandwich structure; and biasing means for providing a bias voltage which is applied to said first and second metal claddings so as to generate at the level of each of said through holes one of said electric field condensing areas.

16. The gas electron multiplier of claim 15, wherein said local electric field amplitude enhancement generated by each of said condensing local areas is substantially symmetrical in relation to an axis of symmetry of said condensing local area which is perpendicular to said plane so that said local electric field amplitude enhancement is at a maximum at the center of symmetry of said condensing local area.

17. The gas electron multiplier of claim 15, comprising a plurality of successive matrices of electric field condensing areas, said successive matrices being disposed parallel to one another and two successive matrices of said successive matrices being spaced apart from each other by a given separating distance in a direction parallel to said parallel field forming a first parallel electric field so as to define therebetween successive electric fields and to allow any electron of one electron avalanche to drift as a primary electron along said separating distance by means of its corresponding parallel electric field such that said gas electron multiplier operates as a preamplifier the gain of which is the product of the gain yield from each successive matrix upstream of said collecting electrode of said radiation detector.

18. A radiation detector in which primary electrons are released into a gas by ionizing radiations, said radiation detector comprising a drift region from which said primary electrons are caused to drift by means of an electric field, a collection region, a gas electron multiplier located between said drift region and said collection region and comprising at least one matrix of electric field condensing areas, said electric field condensing areas being distributed within a solid surface which is substantially perpendicular to said electric field, and a collecting electrode for collecting electrons from said collection region said matrix of electric field condensing areas comprising:

an insulator having metal cladding on opposite faces thereof forming a sandwich structure; and a plurality of through holes extending transversely through said sandwich structure, each of said through holes having an opening aperture diameter comprised between 20 μm and 100 μm.

19. The radiation detector of claim 18, wherein said insulator foil is made of a polymer material of thickness comprised between 25 μm and 500 μm, said through holes being spaced apart from one another at a distance comprised between 50 μm and 300 μm.

20. The radiation detector of claim 18, wherein each through hole of said plurality of through holes is provided with an internal lateral surface delimited by said insulator, said lateral surface comprising at least one local zone in which permanent electric charges are implanted, said permanent electric charges being distributed within said insulator and local zone thereof so as to further enhance and stabilize said electric field at the level of each corresponding electric field condensing area.

21. The radiation detector of claim 18, wherein each through hole of said plurality of through holes is provided with an internal lateral surface delimited by said insulator, said lateral surface comprising at least one local zone of electric conductivity comprised between $10^{15}$ and $10^{16}$ Ω/square.

22. The radiation detector of claim 18, wherein each said through hole of said plurality of through holes has a cross section along a longitudinal plane of symmetry of said through hole which is conical in shape, each of said through holes comprising first and second circular openings of given values different from each other thereby forming first and second opening aperture diameters of different values, said radiation detector further comprising controllable direct and reverse biasing means for providing a direct biasing voltage and a reverse biasing voltage, respectively, which are applied to said first and second metal claddings so as to generate at the level of each of said through holes one of said electric field condensing areas which is thus functionally reversed.

23. A radiation detector for photons emitted by an external source, said radiation detector comprising, in a vessel containing a gas adapted to generate an electron avalanche from a primary electron through an electric field:

an inlet window having an inner face and a transparent electrode disposed on the inner face of said inlet window, said inlet window and transparent electrode being adapted to transmit said photons within said gas;

a photocathode layer facing said transparent electrode, said photocathode layer being adapted to generate one photo-electron as a primary electron under impingement of each one of said photons thereon;

a gas electron multiplier comprising at least one matrix of electric field condensing areas, said matrix of electric field condensing areas comprising:

first and second foil metal-clad insulators on opposed faces of said matrix comprising first and second metal claddings and first and second insulators, said photocathode layer being disposed on said first metal cladding so as to face said transparent electrode, said photocathode layer, and said first and second metal claddings, forming a sandwich structure with said first and second insulators, and a plurality of through holes traversing said sandwich structure such that each of said through holes permits free flowing therethrough of the gas and any electrically charged particle generated therein;

first biasing means for maintaining said transparent electrode and first metal cladding substantially at the same voltage value so as to allow extraction of any photo-electron generated by said photocathode layer under impingement thereof of each one of said photons;

second biasing means for providing a bias voltage which is applied between said first and said second metal claddings, so as to form, at the level of each of said through holes, one of said electric field condensing areas in which a condensed electric field is generated so that said condensed electric field operates to convey each of said photo-electrons to one given electric field condensing area and to then generate from said photo-electron regarded as a primary electron one electron avalanche which is passed through said through hole forming said given electric field condensing area;

a collecting electrode comprising a plurality of elementary anodes, said collecting electrode facing said second metal cladding and being spaced apart therefrom, so as to define a detection region within said vessel; and third biasing means for providing a bias voltage which is applied to said collecting electrode so as to allow the detection of said electron avalanche.

24. The radiation detector of claim 23, wherein said collecting electrode comprises, on an insulator foil:

a first set of elementary anodes disposed on a first face of said insulator foil, said first face of said insulator foil and said first set of elementary anodes facing said gas electron multiplier, said first set of elementary anodes comprising a plurality of parallel electric conductive strips extending along a first given direction a second set of elementary anodes disposed on a second face of said insulator foil, said first and second sets of elementary anodes being thus separated by said insulator foil, said second set of elementary anodes comprising a plurality of parallel electric conductive strips extending along a given direction, transverse to said first given direction, said first and second sets of elementary anodes thereby enabling detection of said electron avalanche along said second and first directions respectively so as to form a bidirectional radiation detector.

25. A radiation detector in which primary electrons are released into a gas by ionizing radiations, said radiation detector comprising a drift region from which the primary electrons are caused to drift by means of an electric field, a collection region, a gas electron multiplier located between said drift region and said collection region, said multiplier comprising a sandwich structure comprising an insulator having first and second conductive surfaces on opposite sides thereof and a plurality of through holes extending transversely through said sandwich structure to form a matrix of electric field condensing areas, each of said electric field condensing areas producing a local electric field amplitude enhancement sufficient to generate in said gas an electron avalanche from any of said primary electrons in said drift region and to transfer multiplied electrons into the collection region, and a collecting electrode for collecting from said collection region multiplied electrons produced by said electron avalanche.

26. A radiation detector in accordance with claim 25, wherein a plurality of gas electron multipliers are disposed between said drift region and said collecting electrode.

* * * * *